(12) United States Patent
Tan et al.

(10) Patent No.: US 11,445,004 B2
(45) Date of Patent: Sep. 13, 2022

(54) METHOD FOR PROCESSING SHARED DATA, APPARATUS, AND SERVER

(71) Applicant: Petal Cloud Technology Co., Ltd., Shenzhen (CN)

(72) Inventors: Jun Tan, Nanjing (CN); Zhengfan Yuan, Nanjing (CN)

(73) Assignee: Petal Cloud Technology Co., Ltd., Dongguan (CN)

( * ) Notice: Subject to any disclaimer, the term of this patent is extended or adjusted under 35 U.S.C. 154(b) by 0 days.

(21) Appl. No.: 17/415,573

(22) PCT Filed: Dec. 3, 2019

(86) PCT No.: PCT/CN2019/122523
§ 371 (c)(1),
(2) Date: Jun. 17, 2021

(87) PCT Pub. No.: WO2020/125396
PCT Pub. Date: Jun. 25, 2020

(65) Prior Publication Data
US 2022/0060568 A1    Feb. 24, 2022

(30) Foreign Application Priority Data

Dec. 17, 2018  (CN) .......................... 201811545173.6

(51) Int. Cl.
*G06F 15/16*      (2006.01)
*H04L 67/01*      (2022.01)
(Continued)

(52) U.S. Cl.
CPC ............. *H04L 67/01* (2022.05); *G06N 7/005* (2013.01); *H04L 67/1097* (2013.01); *H04L 67/568* (2022.05)

(58) Field of Classification Search
None
See application file for complete search history.

(56) References Cited

U.S. PATENT DOCUMENTS

| | | | |
|---|---|---|---|
| 9,880,823 B1* | 1/2018 | Barnea | G06F 9/5066 |
| 2010/0091677 A1* | 4/2010 | Griff | H04L 43/06 |
| | | | 370/252 |
| 2018/0067869 A1 | 3/2018 | Yang et al. | |

FOREIGN PATENT DOCUMENTS

| | | |
|---|---|---|
| CN | 103279330 A | 9/2013 |
| CN | 103631730 A | 3/2014 |

(Continued)

OTHER PUBLICATIONS

Dean et al., "MapReduce: Simplified Data Processing on Large Clusters," USENIX Association, OSDI '04: 6th Symposium on Operating Systems Design and Implementation, pp. 137-149, XP061012415 (Nov. 20, 2004).

(Continued)

*Primary Examiner* — Anh Nguyen
(74) *Attorney, Agent, or Firm* — Leydig, Voit & Mayer, Ltd.

(57) ABSTRACT

A method for processing shared data, an apparatus, and a server are provided, and relate to the field of communications technologies, so that shared data can be cached across application programs, which facilitates data sharing across applications programs, can reduce a quantity of repeated computations, and helps accelerate a computing speed of a Spark architecture. The method includes: receiving a first instruction; starting a first Spark context for a first application program, to create a DAG of the first application program, and caching the DAG of the first application program in a first area of a first server; receiving a second instruction; starting a second Spark context for a second application program reading m DAGs from the first area; and caching the to-be-cached shareable RDDs in a main memory of a second server, where the shareable RDD is an RDD included in at least two DAGs of the m DAGs.

18 Claims, 14 Drawing Sheets

(51) Int. Cl.
*G06N 7/00* (2006.01)
*H04L 67/1097* (2022.01)
*H04L 67/568* (2022.01)

(56) References Cited

FOREIGN PATENT DOCUMENTS

| | | | | |
|---|---|---|---|---|
| CN | 105975582 | A | 9/2016 | |
| CN | 106339458 | A | 1/2017 | |
| CN | 106484368 | A | 3/2017 | |
| CN | 106897411 | A | 6/2017 | |
| CN | 107609141 | A | 1/2018 | |
| CN | 107612886 | A | 1/2018 | |
| CN | 107870763 | A | 4/2018 | |
| CN | 108268638 | A | 7/2018 | |
| CN | 109033340 | A | 12/2018 | |
| CN | 109800092 | A | 5/2019 | |
| CN | 107729138 | B | 11/2020 | |
| CN | 113064870 | A * | 7/2021 | ......... G06F 16/1744 |

OTHER PUBLICATIONS

Chao-Qiang et al., "RDDShare: Reusing Results of Spark RDD," 2016 IEEE First International Conference on Data Science in Cyberspace, pp. 370-375 (2016).

Wang Haihua, "Research on The In-Memory Data Management Technology on Spark Data Processing Framework," Beijing University of Technology, Issue 03, total 118 pages (2017). With English translation of related pages and abstract.

Qingdao Yinggu Education Technology Co., Ltd., "Big Data Development and Application," Shandong Institute of Commerce and Industry, Big Data Development and Application, total 9 pages (Aug. 2018). With English abstract.

Liu Ronghui, "Big Data Architecture Technology and Case Analysis," Northeast Normal University Press, total 10 pages (Jan. 2018). With English abstract.

Tao Qian, "Swarm intelligence and big data analysis technology," Jinan University Press, total 5 pages (Apr. 2018). With English abstract.

* cited by examiner

METHOD FOR PROCESSING SHARED DATA, APPARATUS, AND SERVER

CROSS-REFERENCE TO RELATED APPLICATIONS

This application is a national stage of International Application No. PCT/CN2019/122523, filed on Dec. 3, 2019, which claims priority to Chinese Patent Application No. 201811545173.6, filed on Dec. 17, 2018. Both of the aforementioned applications are hereby incorporated by reference in their entireties.

TECHNICAL FIELD

This application relates to the field of communications technologies, and in particular, to a method for processing shared data, an apparatus, and a server.

BACKGROUND

Spark is a fast and universal compute engine for processing large-scale data. FIG. 1 is a diagram of a Spark architecture. The Spark architecture uses a master-slave model in distributed computing, and includes a master node 100 and at least one slave node 200. The master node 100 and the at least one slave node 200 form a cluster, and jointly execute one or more application programs.

In a process in which Spark executes an application program, the master node 100 starts a driver program (the master node may also be referred to as a driver node), and the at least one slave node 200 separately start an own worker program (the slave node may also be referred to as a worker node). The driver program is an execution start point of the application program, and is responsible for allocating a specific task of the application program. The worker programs separately create a dedicated executor process for the application program, and run, in a multi-thread manner in the executor process, the task allocated by the driver program.

Therefore, from a scheduling perspective (each driver program schedules an own task) or from a running perspective (tasks of different application programs are run in different executors), execution of application programs in Spark is isolated from each other. In other words, data cannot be shared among the application programs in Spark.

However, in an actual scenario, a large amount of same data may exist in different application programs, for example, in different application programs of a same service. Data cannot be shared among the application programs. As a result, Spark performs a large quantity of repeated computations and stores a large amount of duplicate data. These affect a computing speed of Spark.

SUMMARY

This application provides a method, an apparatus, and a server for processing shared data, so that shared data can be cached across application programs. The application facilitates data sharing across application programs, so as to reduce a quantity of repeated computations, accelerate a computing speed of a Spark architecture and a running speed of a device in the Spark architecture, and improve device performance.

According to a first aspect, this application provides a method for processing shared data, where the method is applied to a server cluster, and the method includes the following steps.

A first server receives a first instruction. The first server starts a first Spark context for a first application program, to create a directed acyclic graph (DAG) of the first application program, and caches the DAG of the first application program in a first area of the first server. The first server receives a second instruction. The first server starts a second Spark context for a second application program, to create a DAG of the second application program, and caches the DAG of the second application program in the first area of the first server. The first server reads m number of DAGs from the first area, where the m number of DAGs include the DAG of the first application program and the DAG of the second application program. The first server determines to-be-cached shareable resilient distributed datasets (RDDs) based on the m number of DAGs, and caches the to-be-cached shareable RDDs in a main memory of the server cluster, where the shareable RDD is an RDD included in at least two DAGs of the m number of DAGs.

Therefore, according to the method provided in this embodiment of this application, shareable RDDs included in DAGs of a plurality of application programs may be determined and cached based on the DAGs of the plurality of application programs, thereby implementing caching of the shareable RDDs across application programs. The DAGs of the plurality of application programs include more shareable RDDs. Therefore, when these shareable RDDs are used subsequently, a quantity of repeated computations performed by Spark can be greatly reduced, and a computing speed of Spark can be accelerated.

In a possible implementation, that the first server determines the to-be-cached shareable RDDs based on the m number of DAGs, and caches the to-be-cached shareable RDDs in a main memory of the server cluster includes: computing a quantity of shareable RDDs included in each of the m number of DAGs; determining a first DAG and a shareable RDD included in the first DAG, where the first DAG is a DAG with a largest quantity of shareable RDDs in the m number of DAGs; determining, based on remaining space in the main memory of the server cluster, a to-be-cached shareable RDD included in the first DAG, and caching the to-be-cached shareable RDD included in the first DAG; determining a second DAG and a shareable RDD included in the second DAG, where the second DAG is a DAG with a largest quantity of shareable RDDs in the m number of DAGs other than the first DAG; and determining, based on remaining space in the main memory of the server cluster, a to-be-cached shareable RDD included in the second DAG, and caching the to-be-cached shareable RDD included in the second DAG.

Because a DAG with a largest quantity of reusable RDDs is selected first, the reusable RDDs included in the DAG are cached. Because the DAG has a largest quantity of RDDs that can be reused by another DAG, the reusable RDDs included in the DAG are preferably cached. This can greatly reduce a quantity of repeated computations and reduce an amount of repeatedly cached data, which helps accelerate a computing speed of Spark and save cache costs.

In a possible implementation, determining, based on the remaining space in the main memory of the server cluster, the to-be-cached shareable RDD included in the first DAG includes:

if the remaining space in the main memory of the server cluster is greater than or equal to a sum of magnitudes of all shareable RDDs included in the first DAG, determining all the shareable RDDs included in the first DAG as the to-be-cached shareable RDDs; or if the remaining space in the main memory of the server cluster is less than a sum of magnitudes of all shareable RDDs included in the first DAG, determining some shareable RDDs included in the first DAG as the to-be-cached shareable RDDs.

In a possible implementation, determining some shareable RDDs included in the first DAG as the to-be-cached shareable RDDs includes:

determining, based on a magnitude, a quantity of reuse times, a computing duration, or a magnitude of a dependent parent RDD of each shareable RDD included in the first DAG, some shareable RDDs included in the first DAG as the to-be-cached shareable RDDs; or determining a shareable RDD that is found in the first DAG as the to-be-cached shareable RDD.

In a possible implementation, determining, based on the remaining space in the main memory of the server cluster, a to-be-cached shareable RDD included in the first DAG also includes:

if the remaining space in the main memory of the server cluster is greater than or equal to a sum of magnitudes of all shareable RDDs included in the first DAG, determining all the shareable RDDs included in the first DAG as the to-be-cached shareable RDDs; or if the remaining space in the main memory of the server cluster is less than a sum of magnitudes of all shareable RDDs included in the first DAG, determining a to-be-replaced RDD included in the main memory of the server cluster, and determining, based on the remaining space in the main memory of the server cluster and a magnitude of the to-be-replaced RDD, the to-be-cached shareable RDD included in the first DAG.

In a possible implementation, determining the to-be-replaced RDD included in the main memory of the server cluster includes:

determining the to-be-replaced RDD based on a magnitude, a quantity of reuse times, a computing duration, or a magnitude of a dependent parent RDD of each shareable RDD cached in the main memory of the server cluster.

In a possible implementation, determining, based on the remaining space in the main memory of the server cluster and a magnitude of the to-be-replaced RDD, the to-be-cached shareable RDD included in the first DAG includes:

if a sum of the remaining space in the main memory of the server cluster and the magnitude of the to-be-replaced RDD is greater than or equal to the sum of the magnitudes of all the shareable RDDs included in the first DAG, determining all the shareable RDDs included in the first DAG as the to-be-cached shareable RDDs; or if a sum of the remaining space in the main memory of the server cluster and the magnitude of the to-be-replaced RDD is less than the sum of the magnitudes of all the shareable RDDs included in the first DAG, determining some shareable RDDs included in the first DAG as the to-be-cached shareable RDDs.

In a possible implementation, determining some shareable RDDs included in the first DAG as the to-be-cached shareable RDDs includes:

determining, based on a magnitude, a quantity of reuse times, a computing duration, or a magnitude of a dependent parent RDD of each shareable RDD included in the first DAG, some shareable RDDs included in the first DAG as the to-be-cached shareable RDDs; or determining a shareable RDD that is found in the first DAG as the to-be-cached shareable RDD.

In a possible implementation, the caching the to-be-cached shareable RDD included in the first DAG includes:

removing the to-be-replaced RDD from the main memory of the server cluster, and caching the to-be-cached shareable RDD included in the first DAG.

In a possible implementation, the method further includes: determining a third DAG in the m number of DAGs; and reading a shareable RDD included in the third DAG from the main memory of the server cluster, and transforming the third DAG into a fourth DAG based on the shareable RDD included in the third DAG, where an execution result of the fourth DAG and an execution result of the third DAG are the same.

In a possible implementation, an execution duration of the fourth DAG is less than an execution duration of the third DAG.

According to a second aspect, a server is provided, including a processor, a memory, and a communications interface. The memory and the communications interface are coupled to the processor. The memory is configured to store computer program code, where the computer program code includes a computer instruction. When the processor reads the computer instruction from the main memory, the server is enabled to perform the following operations:

receiving a first instruction; starting a first Spark context for a first application program, to create a directed acyclic graph (DAG) of the first application program, and caching the DAG of the first application program in a first area of a first server; receiving a second instruction; starting a second Spark context for a second application program, to create a DAG of the second application program, and caching the DAG of the second application program in the first area of the first server; reading m number of DAGs from the first area, where the m number of DAGs include the DAG of the first application program and the DAG of the second application program; and determining to-be-cached shareable resilient distributed datasets (RDDs) based on the m number of DAGs, and caching the to-be-cached shareable RDDs in a main memory of a server cluster, where the shareable RDD is an RDD included in at least two DAGs of the m number of DAGs.

In a possible implementation, determining the to-be-cached shareable RDDs based on the m number of DAGs, and caching the to-be-cached shareable RDDs in a main memory of a server cluster includes:

computing a quantity of shareable RDDs included in each of the m number of DAGs; determining a first DAG and a shareable RDD included in the first DAG, where the first DAG is a DAG with a largest quantity of shareable RDDs in the m number of DAGs; determining, based on remaining space in the main memory of the server cluster, a to-be-cached shareable RDD included in the first DAG, and caching the to-be-cached shareable RDD included in the first DAG; determining a second DAG and a shareable RDD included in the second DAG, where the second DAG is a DAG with a largest quantity of shareable RDDs in the m number of DAGs other than the first DAG; and determining, based on remaining space in the main memory of the server cluster, a to-be-cached shareable RDD included in the second DAG, and caching the to-be-cached shareable RDD included in the second DAG.

In a possible implementation, determining, based on remaining space in the main memory of the server cluster, the to-be-cached shareable RDD included in the first DAG includes:

if the remaining space in the main memory of the server cluster is greater than or equal to a sum of magnitudes of all shareable RDDs included in the first DAG, determining all the shareable RDDs included in the first DAG as the to-be-cached shareable RDDs; or if the remaining space in the main memory of the server cluster is less than a sum of magnitudes of all shareable RDDs included in the first DAG, determining some shareable RDDs included in the first DAG as the to-be-cached shareable RDDs.

In a possible implementation, determining some shareable RDDs included in the first DAG as the to-be-cached shareable RDDs includes:

determining, based on a magnitude, a quantity of reuse times, a computing duration, or a magnitude of a dependent parent RDD of each shareable RDD included in the first DAG, some shareable RDDs included in the first DAG as the to-be-cached shareable RDDs; or determining a shareable RDD that is found in the first DAG as the to-be-cached shareable RDD.

In a possible implementation, determining the to-be-cached shareable RDDs based on the m number of DAGs, and caching the to-be-cached shareable RDDs in a main memory of a server cluster further includes:

if the remaining space in the main memory of the server cluster is greater than or equal to a sum of magnitudes of all shareable RDDs included in the first DAG, determining all the shareable RDDs included in the first DAG as the to-be-cached shareable RDDs; or if the remaining space in the main memory of the server cluster is less than a sum of magnitudes of all shareable RDDs included in the first DAG, determining a to-be-replaced RDD included in the main memory of the server cluster, and determining, based on the remaining space in the main memory of the server cluster and a magnitude of the to-be-replaced RDD, the to-be-cached shareable RDD included in the first DAG.

In a possible implementation, determining the to-be-replaced RDD included in the main memory of the server cluster includes:

determining the to-be-replaced RDD based on a magnitude, a quantity of reuse times, a computing duration, or a magnitude of a dependent parent RDD of each shareable RDD cached in the main memory of the server cluster.

In a possible implementation, determining, based on the remaining space in the main memory of the server cluster and a magnitude of the to-be-replaced RDD, the to-be-cached shareable RDD included in the first DAG includes:

if a sum of the remaining space in the main memory of the server cluster and the magnitude of the to-be-replaced RDD is greater than or equal to the sum of the magnitudes of all the shareable RDDs included in the first DAG, determining all the shareable RDDs included in the first DAG as the to-be-cached shareable RDDs; or if a sum of the remaining space in the main memory of the server cluster and the magnitude of the to-be-replaced RDD is less than the sum of the magnitudes of all the shareable RDDs included in the first DAG, determining some shareable RDDs included in the first DAG as the to-be-cached shareable RDDs.

In a possible implementation, the caching the to-be-cached shareable RDD included in the first DAG includes:

removing the to-be-replaced RDD from the main memory of the server cluster, and caching the to-be-cached shareable RDD included in the first DAG.

In a possible implementation, the server further performs the following operations:

determining a third DAG in the m number of DAGs; and reading a shareable RDD included in the third DAG from the main memory of the server cluster, and transforming the third DAG into a fourth DAG based on the shareable RDD included in the third DAG, where an execution result of the fourth DAG and an execution result of the third DAG are the same.

According to a third aspect, a computer storage medium is provided, including a computer instruction. When the computer instruction is run on a server, the server is enabled to perform the method according to any one of the first aspect or the possible implementations of the first aspect.

According to a fourth aspect, a computer program product is provided. When the computer program product is run on a computer, the computer is enabled to perform the method according to any one of the first aspect or the possible implementations of the first aspect.

According to a fifth aspect, a server is provided, including one or more processors, and one or more memories coupled to the one or more processors. The one or more memories are configured to store computer program code, where the computer program code includes a computer instruction. When the one or more processors read the computer instruction from the one or more memories, the server is enabled to perform the steps described in the foregoing method embodiment.

DESCRIPTION OF EMBODIMENTS

The following describes technical solutions in embodiments of this application with reference to the accompanying drawings. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "multiple" means two or more than two.

Spark is one of next-generation frameworks for big data distributed processing and can be used in scenarios of large-scale data computations. For example, Spark can be applied to recommendation services or services for computing user preference. For example, on a server side, content that users are interested in may be determined based on a large amount of data about the users' use habits, for example, information such as a duration or a time period of watching a specific type of video or a specific video, listening to a specific type of music or a specific piece of music, or viewing a specific type of news, so that related content can be pushed to the users on a client side, and the like.

In Spark, a concept of a resilient distributed dataset (RDD) is innovatively proposed. An RDD is a distributed object set, and is essentially a read-only partition record set. In addition, each RDD may be divided into a plurality of partitions, and each partition is a dataset segment. In addition, different partitions of an RDD may be stored on different nodes in a cluster, so that parallel computations may be performed on the different nodes in the cluster.

For better understanding of the technical solutions provided in the embodiments of this application, terms related to an RDD are first described.

RDD transformation operation: Generate an RDD by using source data (a text file, a chart file, or the like), or transform an existing RDD (for example, an RDD 1) into another RDD (for example, an RDD 2). The RDD 1 is referred to as a parent RDD of the RDD 2, and the RDD 2 is referred to as a child RDD of the RDD 1. Common transformation operations include a map operation, a filter operation, a WideMapping (WideMapping) operation, a union operation, a join operation, a reduceByKey operation, and the like.

Figure 2:
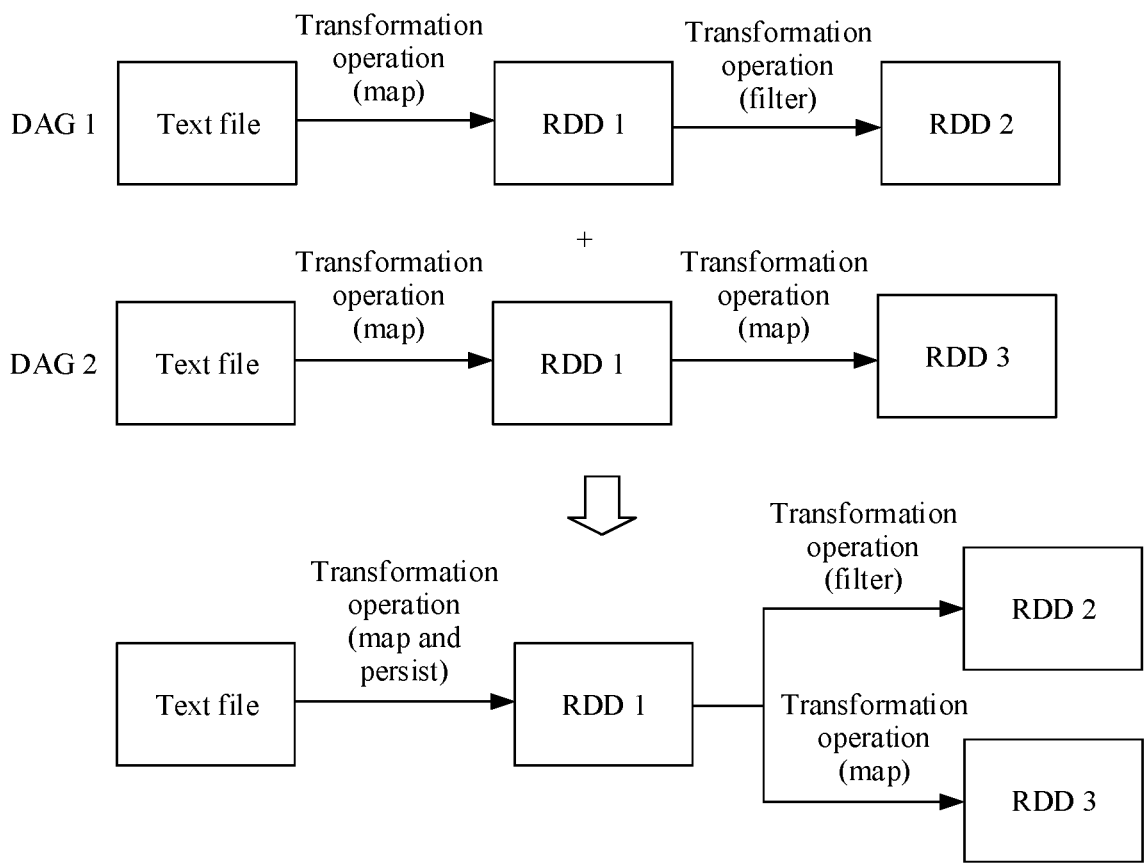
FIG. 2 is a schematic diagram of a method for transforming a DAG in the prior art.

Directed acyclic graph (DAG): A plurality of transformation operations are provided for an RDD, and a new RDD is generated after each transformation operation. In other words, a new RDD depends on an original RDD, and the dependency between the RDDs forms a DAG. For example, as shown in FIG. 2, a DAG 1 is that a map operation is performed on a text file (source data) to generate an RDD 1, and then a filter operation is performed to generate an RDD 2.

Dependency between RDDs: Different RDD transformation operations result in different dependencies between partitions of different RDDs. The dependencies are divided into a narrow dependency and a wide dependency. In the narrow dependency, a partition of one parent RDD corresponds to a partition of one child RDD, or partitions of a plurality of parent RDDs correspond to a partition of one child RDD. In the wide dependency, one partition of one parent RDD corresponds to a plurality of partitions of one child RDD. The RDD dependency design enables an RDD to be fault-tolerant and helps accelerate an execution speed of Spark.

RDD sharing: During RDD transformation, if two or more DAGs have a same RDD, the same RDD can be reused by the DAGs, thereby implementing sharing. The same RDD may be referred to as a shareable RDD, or may be referred to as a reusable RDD. For example, still as shown in FIG. 2, by comparing the DAG 1 and a DAG 2, it can be learned that the DAG 1 and the DAG 2 have a same part, that is, a process of generating the RDD 1 by using a text file. To avoid repeated computations performed on the same part, persistence (or caching) may be performed on the RDD 1 when the RDD 1 is generated after a map transformation operation is performed on the text file. In this way, the RDD 1 may be directly invoked when the RDD 2 and an RDD 3 are generated subsequently, where the RDD 1 is a shareable RDD or a reusable RDD.

RDD persistence: Not every RDD is stored during RDD transformation. If an RDD is to be reused or cost of computing the RDD is high, the RDD may be stored by displaying a result of invoking a persist( ) or cache( ) method provided by the RDD.

Figure 3:
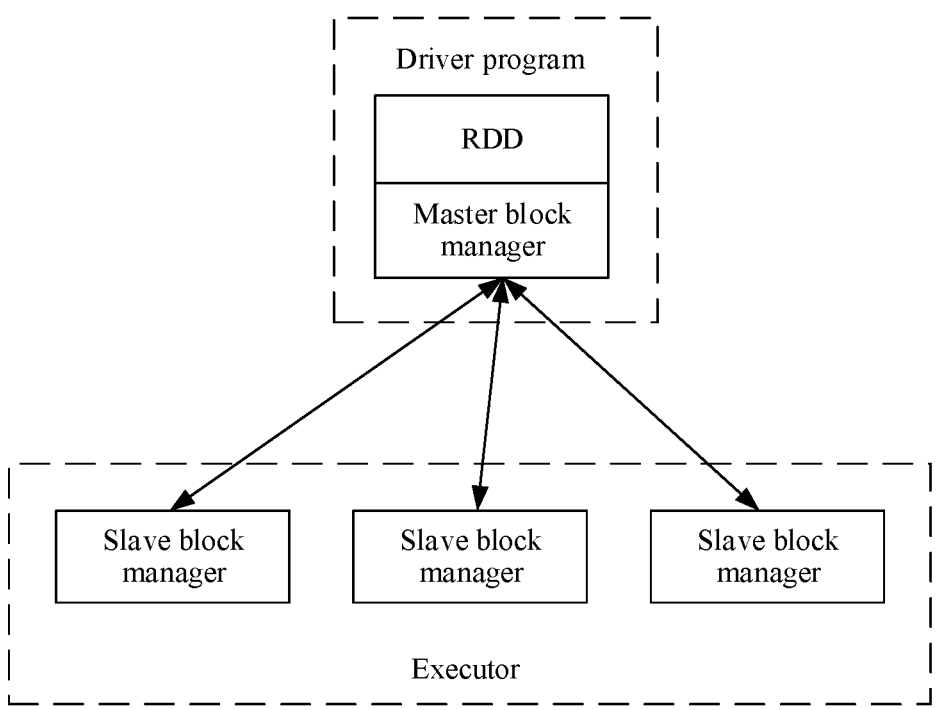
FIG. 3 is a schematic diagram of a method for storing an RDD in the prior art.

RDD storage: RDD data is stored in a block form on a plurality of machines (that may be physical machines, virtual machines, or the like). FIG. 3 is a diagram of an RDD storage architecture in Spark. Each worker node starts a block manager slave (BlockManagerSlave) to manage some blocks, but metadata of the blocks is stored by a block manager master (BlockManagerMaster) of a driver node. After generating a block, the BlockManagerSlave registers the block with the BlockManagerMaster. The BlockManagerMaster manages a relationship between an RDD and a block. When an RDD does not need to be stored anymore, the BlockManagerMaster sends an instruction to the BlockManagerSlave to delete a corresponding block.

Figure 4:
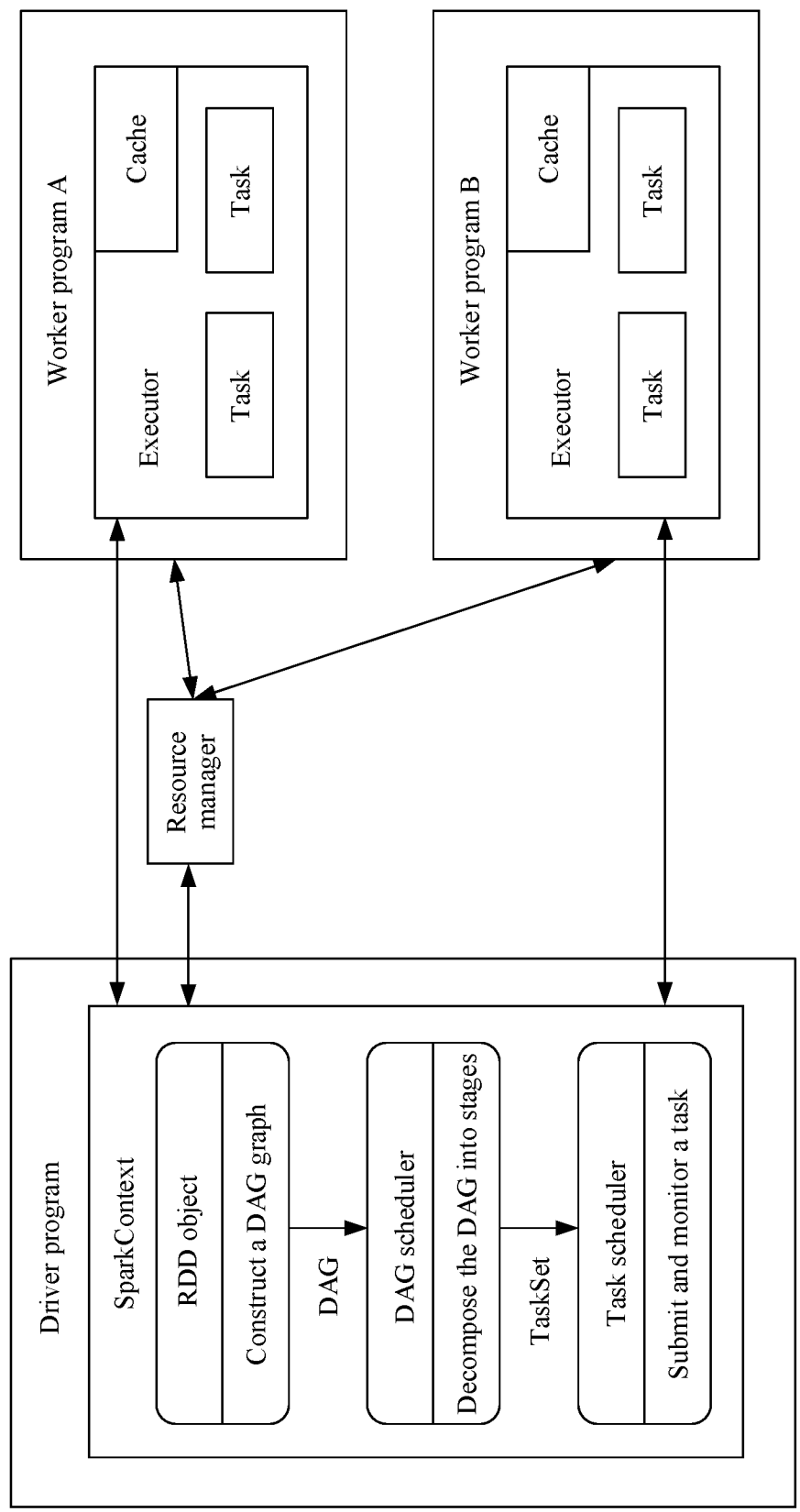
FIG. 4 is a schematic flowchart of Spark running an application program in the prior art.

The following briefly describes a process of Spark running an application program. FIG. 4 is a schematic flowchart of Spark running an application program. The process includes the following steps.

Step 1: When starting an application program, a driver program first constructs a running environment of the application program, that is, starts a Spark context (SparkContext).

Step 2: The SparkContext applies for a resource from a resource manager, where the resource manager is configured to allocate a resource and monitor resource usage.

The resource manager may also be referred to as a cluster manager, and is an external service for obtaining a resource in the cluster. Spark supports different running modes, including Local, Standalone, Apache Mesos, and Hadoop Yarn. The resource manager varies depending on the running mode. For example, in the Standalone running mode, the resource manager serves as native resource management of Spark, and a master node is responsible for resource allocation. In the Hadoop Yarn running mode, the resource manager mainly refers to a resource manager in Yarn. In the Apache Mesos running mode, the resource manager is a resource scheduling framework that is well compatible with Hadoop MapReduce.

Step 3: The resource manager allocates a resource, and a dedicated executor for the application program is separately created in a plurality of worker programs.

Step 4: Each executor applies for a task from the SparkContext.

Step 5: The SparkContext loads source data (such as a text file and a chart file) from each executor, creates an RDD, and constructs a DAG. The SparkContext decomposes an RDD included in the DAG into stages, then decomposes the stages into tasks, and serializes and sends the tasks and dependent data of the tasks to each executor.

A stage includes a plurality of groups of tasks, which form a task set (TaskSet).

Step 6: Each executor runs the task allocated to it and releases all resources after the running is completed.

In the prior art, after receiving a request for starting an application program, a resource manager allocates a container to a driver node. Then, the driver node starts a SparkContext of the application program in the container. That is, the resource manager allocates a container for each application program, and a SparkContext of the application program is started in the container. In other words, SparkContexts of different application programs correspond to different containers. In addition, mutual data access cannot be performed among the different containers. Therefore, the SparkContexts of the different application programs cannot share data.

Figure 5A:
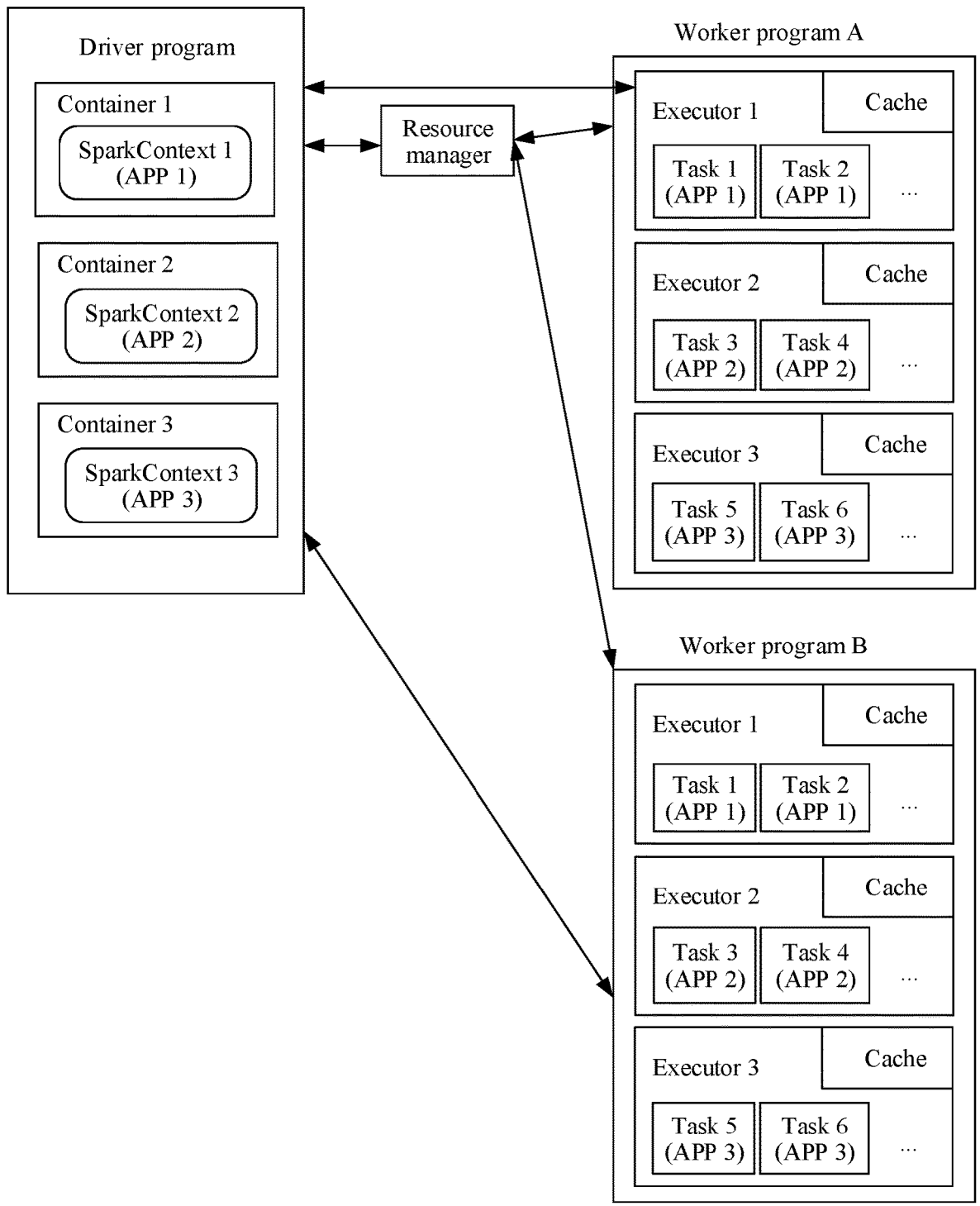
FIG. 5A is a schematic flowchart of Spark running a plurality of application programs in the prior art.

For example, FIG. 5A is a schematic diagram of Spark starting a plurality of application programs in the prior art. A resource manager allocates a container 1, a container 2, and a container 3 for an APP 1, an APP 2, and an APP 3 respectively. Then, a driver node starts a SparkContext 1 of the APP 1 in the container 1, starts a SparkContext 2 of the APP 2 in the container 2, and starts a SparkContext 3 of the APP 3 in the container 3. The SparkContext 1, the SparkContext 2, and the SparkContext 3 are located in different containers. Therefore, the SparkContext 1, the SparkContext 2, and the SparkContext 3 cannot access data from each other. Subsequently, the three SparkContexts apply for resources of a plurality of worker nodes (for example, a worker program A and a worker program B), and create three executors on the plurality of worker nodes separately. Each executor executes a task corresponding to an application program of the executor. It can be learned that data cannot be shared among different application programs.

However, in an actual scenario, a large amount of duplicate data may exist in a plurality of application programs. For example, a large quantity of same RDDs usually exists in different application programs of a same type of services (services of a video type, services of a music type, services of a payment type, or the like). If RDD sharing cannot be implemented among the different application programs, a large quantity of repeated computations occur, wasting computing resources.

Therefore, this application provides a data sharing method that may be performed on a driver node, and can implement RDD data sharing among a plurality of application programs in Spark, so as to reduce a large quantity of repeated computations and accelerate a computing speed of Spark.

In this application, when a resource manager allocates a container to the driver node, the resource manager allocates one container for the plurality of application programs. Then, the driver node starts a SparkContext of each application program in the container. In other words, the SparkContexts of the plurality of application programs are started in the same container. Because the SparkContexts in the same container can access data from each other, the plurality of application programs in the same container can access data from each other. In other words, the driver node may access data of different application programs in the same container, for example, DAGs created by the SparkContexts of the different application programs in the same container. That is, the driver node may access the DAGs of the plurality of application programs in the same container. In this way, the DAGs of the plurality of application programs in the same container may be processed in a centralized manner, to implement data sharing among the plurality of application programs, thereby reducing a quantity of repeated computations performed by Spark and accelerating a computing speed of Spark.

The plurality of application programs may be a plurality of application programs of a same service (or similar services). Because the plurality of application programs belongs to the same service or the similar services, they have a large amount of same data, and use same or similar computations. Then, a large quantity of same RDDs are generated. These same RDDs are shareable RDDs, and may also be referred to as reusable RDDs. Obviously, RDD sharing among the plurality of application programs can greatly avoid repeated computations, accelerate running speeds of the plurality of application programs, and accelerate a computing speed of Spark. It may be understood that the plurality of application programs may alternatively be other similar or associated application programs. A relationship between the plurality of application programs is not limited in this application.

Figure 5B:
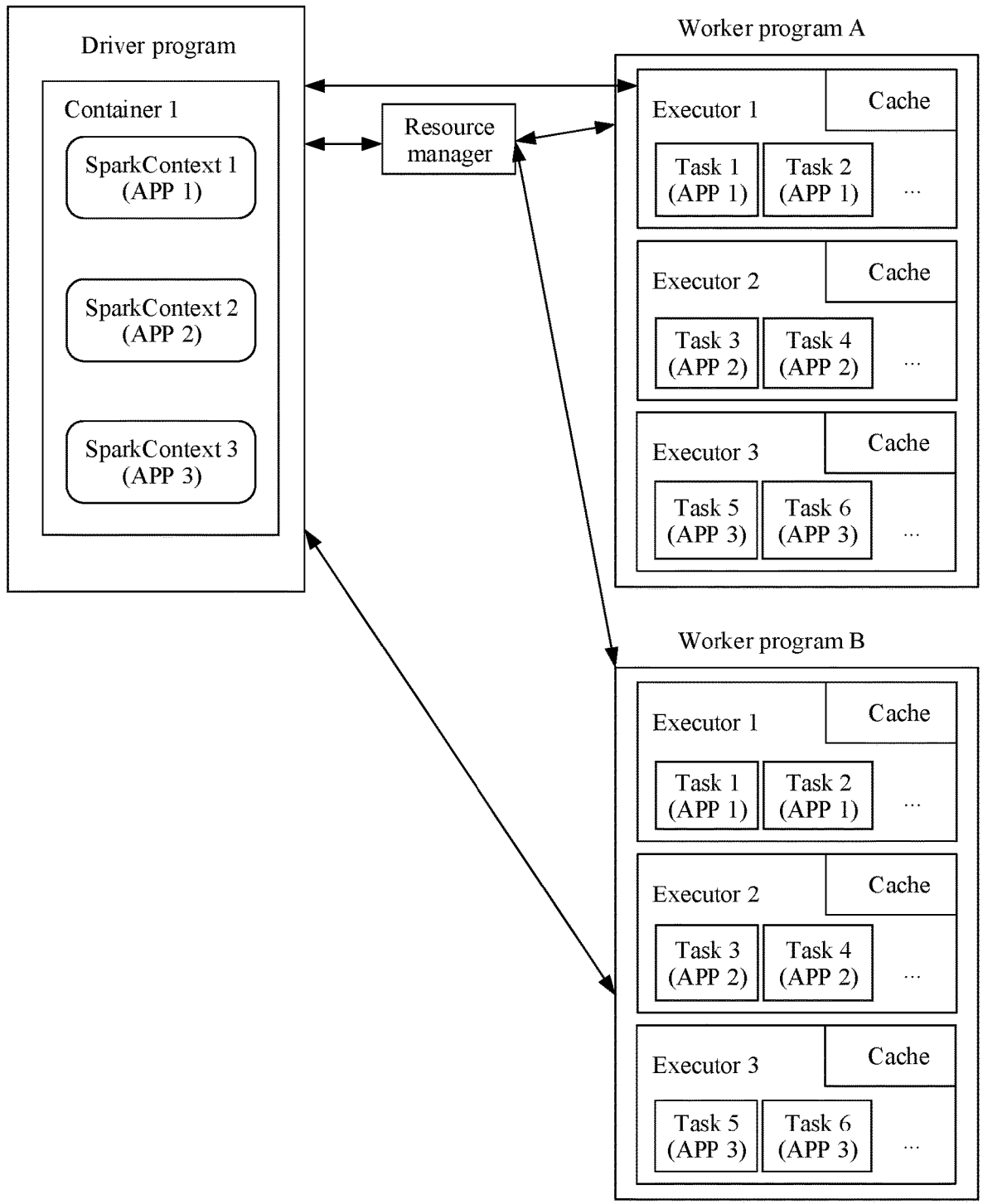
FIG. 5B is a schematic flowchart of Spark running a plurality of application programs in accordance with one or more embodiments.

For example, FIG. 5B is a schematic diagram of Spark starting a plurality of application programs according to this application. A resource manager allocates a container 1 for an APP 1, an APP 2, and an APP 3. Then, a driver node starts a SparkContext 1 of the APP 1, a SparkContext 2 of the APP 2, and a SparkContext 3 of the APP3 in the container 1. The SparkContext 1, the SparkContext 2, and the SparkContext 3 are located in the same container. Therefore, the SparkContext 1, the SparkContext 2, and the SparkContext 3 can access data from each other. In this case, for a DAG constructed by the SparkContext 1, a DAG constructed by the SparkContext 2, and a DAG constructed by the SparkContext 3, the SparkContext 1, the SparkContext 2, and the SparkContext 3 can also access DAG from each other.

Simply put, when DAGs of a plurality of application programs in a same container are processed subsequently, reusable RDDs included in the DAGs of the plurality of application programs may be determined and cached. Subsequently, the DAGs of the plurality of application programs are transformed based on the cached reusable RDDs. Post-transformation DAGs and pre-transformation DAGs have same computing results, but the post-transformation DAGs can directly invoke the cached reusable RDDs during a computation. Therefore, a computing speed is greatly accelerated. It should be noted that, in this application, the DAGs of the plurality of application programs are used as processing objects, the determined reusable RDDs may also be used across application programs. That is, RDD data can be shared among the plurality of application programs in Spark.

Figure 5C:
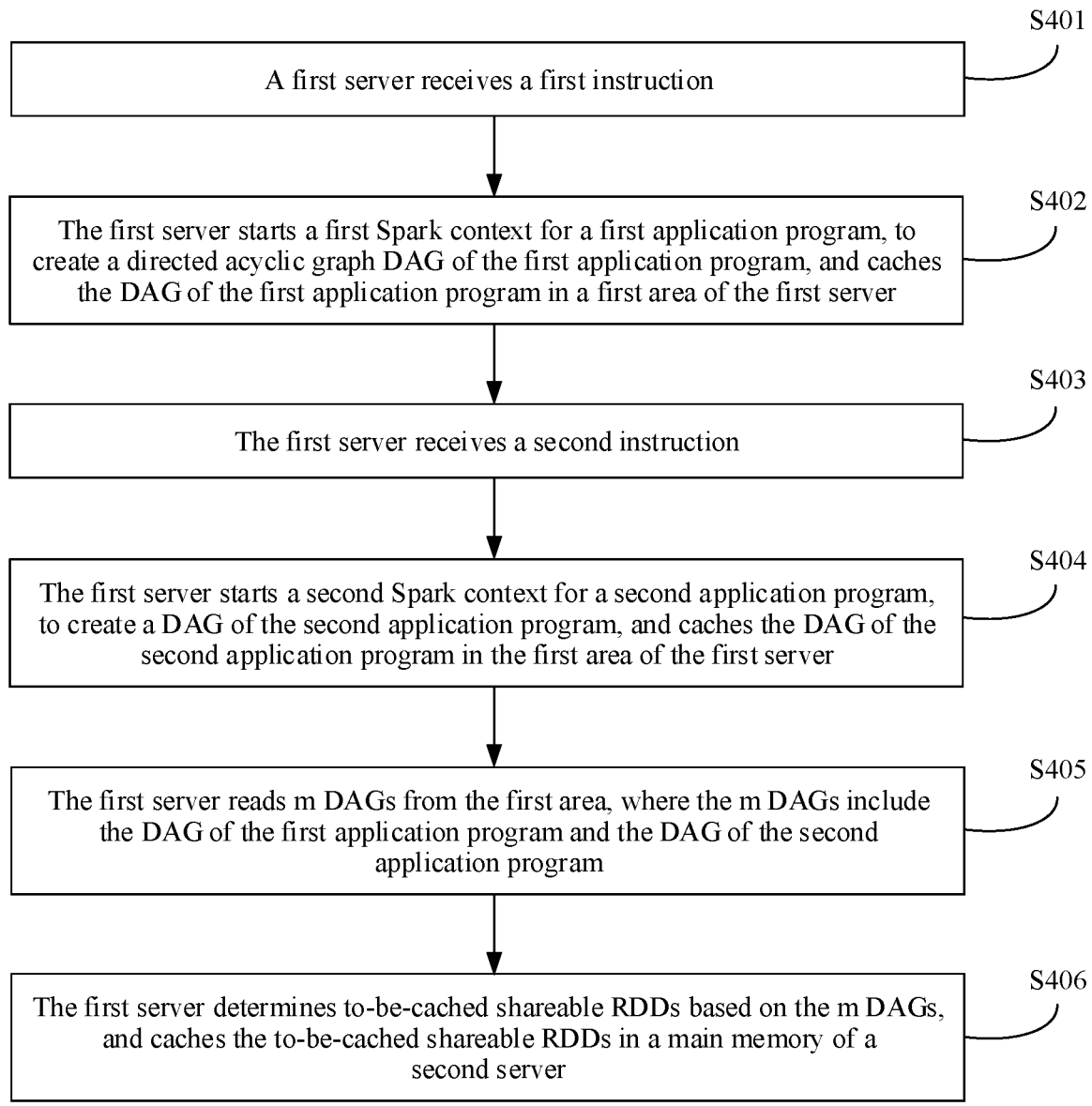
FIG. 5C is a schematic flowchart of a method for caching a shareable RDD in accordance with one or more embodiments.

FIG. 5C is a flowchart of a method for caching a shareable RDD in accordance with one or more embodiments. The method may be used when a first server (that is, a driver node) is run, and the method includes the following steps.

S401: The first server receives a first instruction.

The first instruction may be an instruction for requesting the first server to start a first application program.

S402: The first server starts a first Spark context (for example, a SparkContext 1) for the first application program, to create a DAG of the first application program, and caches the DAG of the first application program in a first area of the first server.

The first area of the first server is a resource for which the first server applies from a resource manager, and may be understood as a container allocated by the resource manager for the first application program, as mentioned above.

S403: The first server receives a second instruction.

The second instruction may be an instruction for requesting the first server to start a second application program.

S404: The first server starts a second Spark context (for example, a SparkContext 2) for the second application program, to create a DAG of the second application program, and caches the DAG of the second application program in the first area of the first server.

It may be understood as that the first server starts the second Spark context in the container allocated by the resource manager for the first application program, and then the DAG that is of the second application program and that is created by the second Spark context is cached in the container. That is, the DAG of the first application program and the DAG of the second application program are cached in the same container.

S405: The first server reads m number of number of DAGs from the first area, where the m number of DAGs include the DAG of the first application program and the DAG of the second application program.

S406: The first server determines a to-be-cached shareable RDD based on the m number of DAGs, and caches the to-be-cached shareable RDD in a main memory of a second server.

The shareable RDD is an RDD included in at least two DAGs of the m number of DAGs.

The main memory of the second server is a main memory of the first server, the main memory of the second server, or a sum of all or some of a main memory of the first server and all or some of the main memory of the second server.

It should be noted that, in a Spark framework, main memory may be shared among a plurality of servers, and as mentioned above, RDD data is stored in a block form on a plurality of servers (that may be physical machines, virtual machines, or the like). Therefore, the main memory of the second server refers to total main memory of a plurality of servers in a cluster, and main memory of a specific server or main memory of a plurality of servers are not specifically distinguished.

Figure 1:
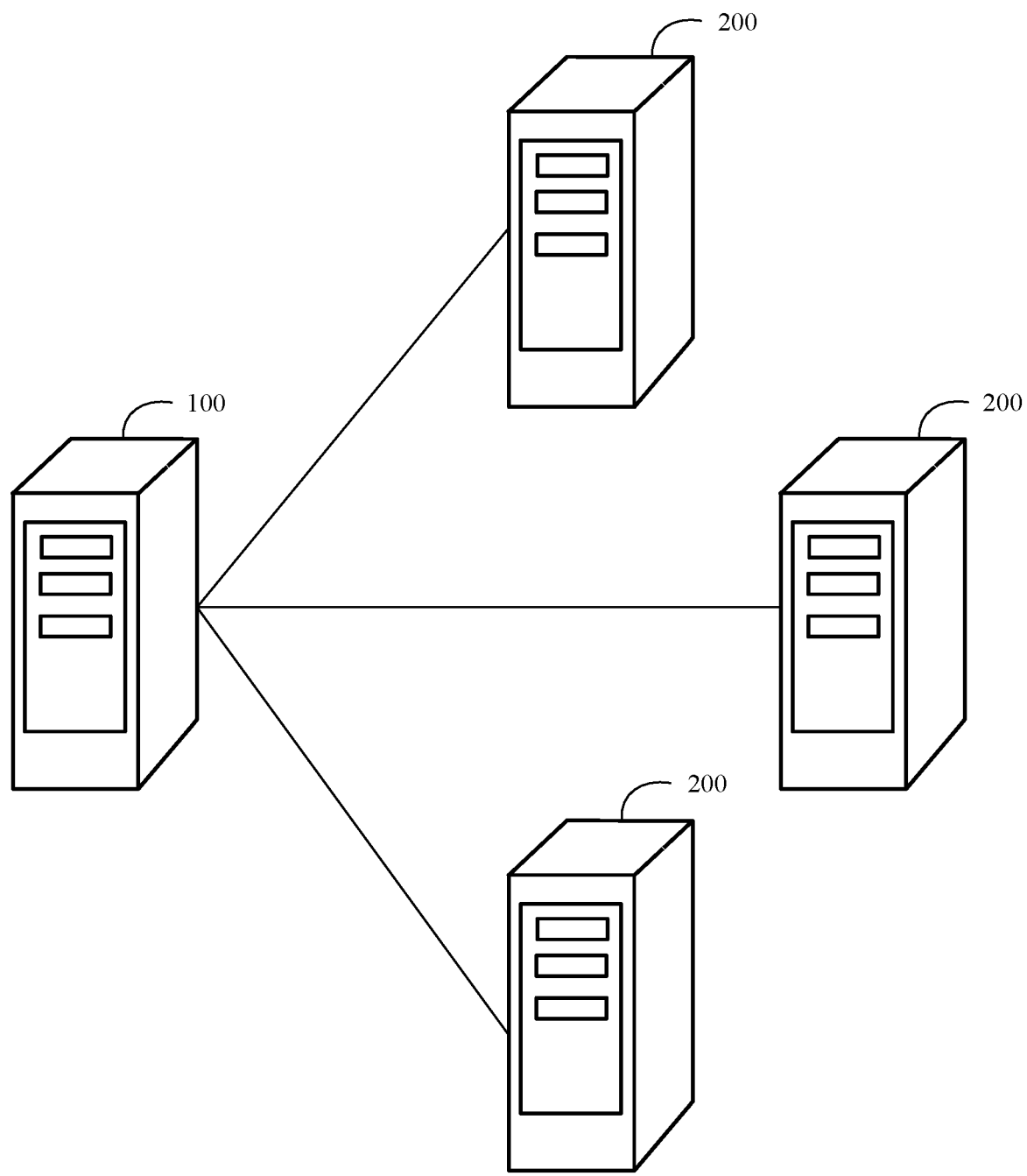
FIG. 1 is a network structure diagram of a Spark framework in the prior art.

The data sharing method provided in this application may be applied to the Spark framework shown in FIG. 1. The Spark framework includes one or more driver nodes and one or more worker nodes. The driver node and the worker node may be a same server or different servers. For example, the driver node and the worker node may be a server 300 shown in FIG. 6A.

Figure 6A:
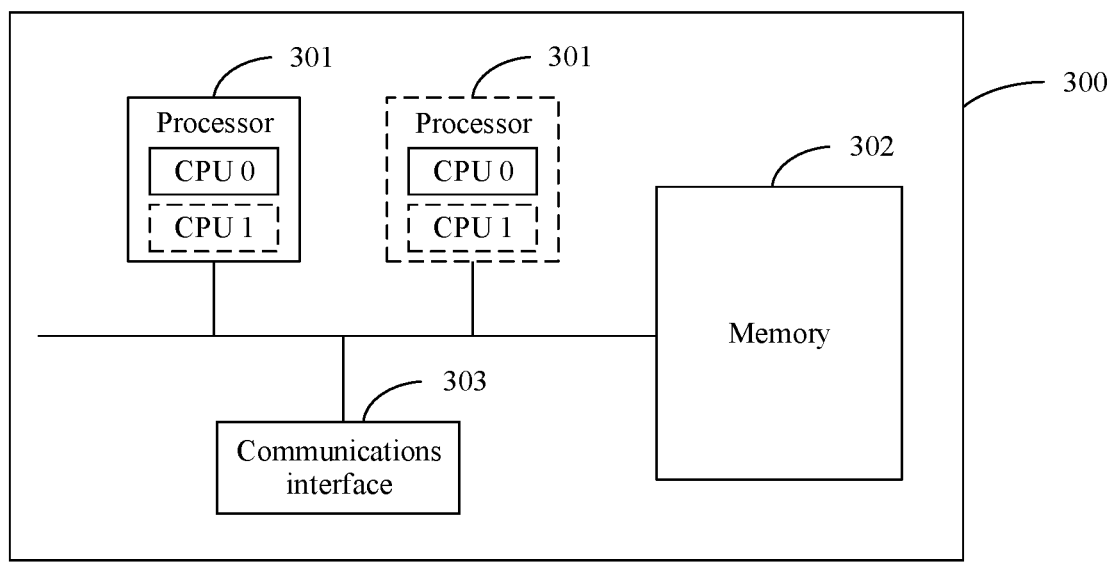
FIG. 6A is a schematic structural diagram of a server according to an embodiment of this application.

FIG. 6A is a schematic diagram of a hardware structure of a server 300 disclosed in one or more embodiments of this application. The server 300 includes at least one processor 301, at least one memory 302, and at least one communications interface 303. Optionally, the server 300 may further include an output device and an input device, which are not shown in the figure.

The processor 301, the memory 302, and the communications interface 303 are connected by using a bus. The processor 301 may be a general-purpose central processing unit (CPU), a microprocessor, an application-specific integrated circuit (ASIC), or one or more integrated circuits configured to control program execution in the solutions of this application. The processor 301 may also include a plurality of CPUs, and the processor 301 may be a single-CPU processor or a multi-CPU processor. The processor herein may be one or more devices, circuits, or processing cores configured to process data (for example, a computer program instruction).

In this application, the processor 301 is configured to: compute a quantity of reusable RDDs included in each DAG in a first window, determine a DAG with a largest quantity of reusable RDDs as a first DAG, determine, based on remaining space in a main memory, whether all or some of the reusable RDDs included in the first DAG may be cached, select a to-be-replaced RDD from cached RDDs for marking, and the like.

The memory 302 may be a read-only memory (ROM) or another type of static storage device capable of storing static information and an instruction, or a random access memory (RAM) or another type of dynamic storage device capable of storing information and an instruction. The memory 302 may alternatively be an electrically erasable programmable read-only memory (EPROM), a compact disc read-only memory (CD-ROM) or other compact disc storage, optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of an instruction or a data structure and capable of being accessed by a computer, but is not limited thereto. The memory 302 may exist independently, and is connected to the processor 301 by using a bus. The memory 302 may alternatively be integrated with the processor 301. The memory 302 is configured to store application program code for executing the solutions of this application, and the execution is controlled by the processor 301. The processor 301 is configured to execute the application program code stored in the memory 302, to implement the data sharing method in this embodiment of this application.

In this application, the memory 302 may be configured to store a reusable RDD, and the like.

The communications interface 303 may be configured to communicate with another device or communications network, such as an Ethernet or a wireless local area network (WLAN).

In this application, the communications interface 303 may be configured for communication between driver nodes, communication between worker nodes, communication between a driver node and a worker node, or the like.

The output device communicates with the processor 301, and may display information in a plurality of manners. For example, the output device may be a liquid crystal display (LCD), a light-emitting diode (LED) display device, a cathode-ray tube (CRT) display device, or a projector. The input device communicates with the processor 301, and may receive, in a plurality of manners, input from a user. For example, the input device may be a mouse, a keyboard, a touchscreen device, or a sensing device.

The following describes in detail a method for sharing data in DAGs of a plurality of application programs in a same container with reference to accompanying drawings.

Figure 6B:
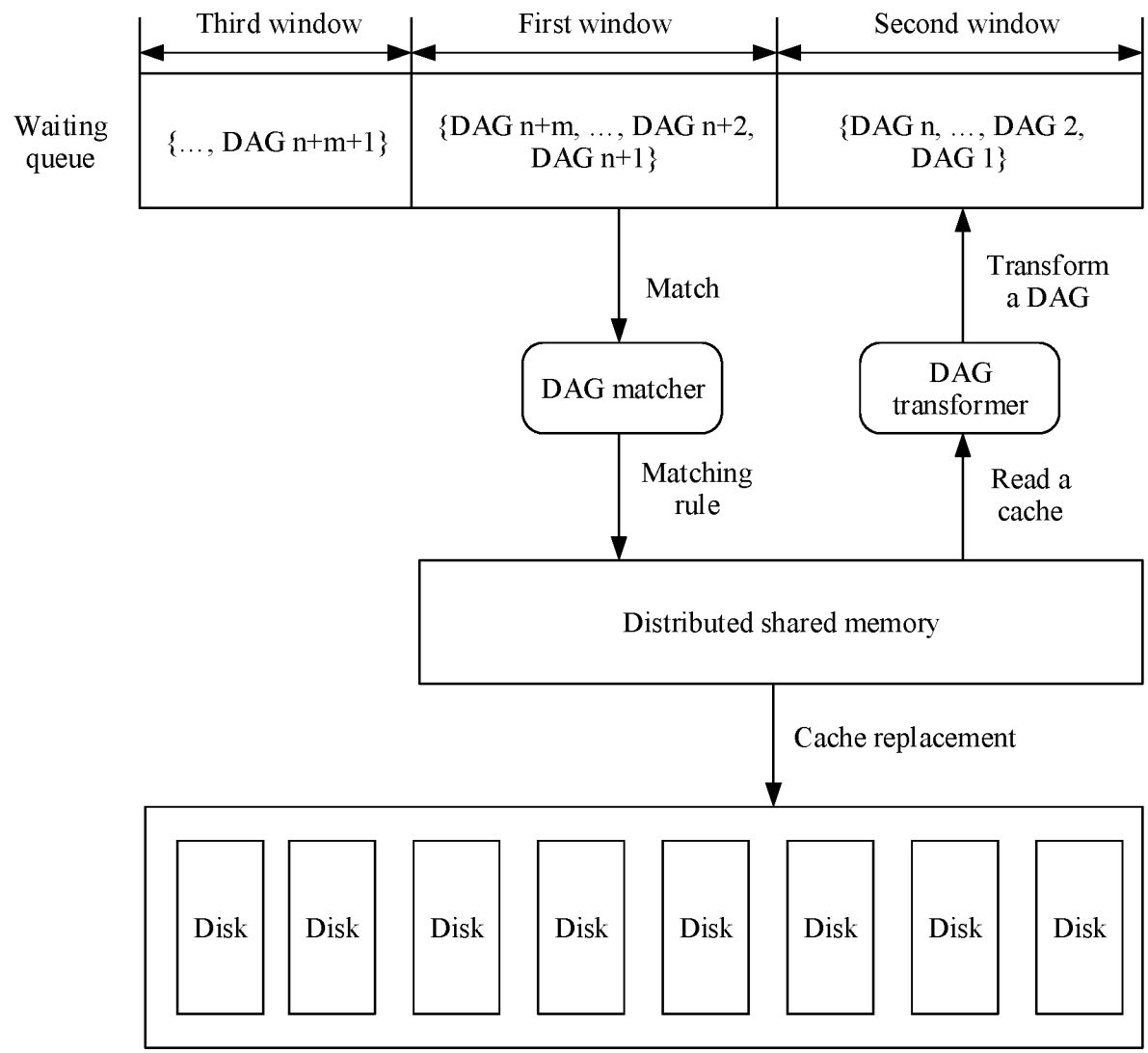
FIG. 6B is a schematic diagram of a framework of an RDD sharing system in accordance with one or more embodiments.

FIG. 6B is a schematic diagram of a framework of an RDD sharing system in accordance with one or more embodiments. The RDD sharing system may be run on a driver node, and may include a DAG waiting queue, a DAG matcher, a DAG transformer, a distributed shared main memory (which may be referred to as a shared main memory for short), and disks.

In some examples, the DAG waiting queue may include a first window and a second window. For DAGs queued in the first window, when there is a vacancy in the second window, a DAG meeting a condition may be selected from the first window for covering. That is, after transformation, a DAG enters the second window from the first window. DAGs queued in the second window are waiting DAGs that can be executed when a Spark kernel is idle. For example, a DAG is decomposed into stages, the stages are decomposed into tasks, and then the tasks are allocated to worker nodes so that the worker nodes can run the tasks, and the like. In some other examples, the DAG waiting queue may further include a third window, and the third window includes a to-be-executed DAG queued after the first window.

A magnitude of each window may be understood as a quantity of DAGs, an amount of data, or the like in each window. For example, a quantity of DAGs that can be queued in the first window may be $10^3$ to $10^5$. In some examples, the magnitude of each window may be determined based on service types (for example, a video service, a music service, or a payment service) of a plurality of application programs running in a cluster. The window magnitude may vary according to the service type. In some other examples, the magnitude of each window may be alternatively determined based on a hardware capability (for example, a main memory or CPU running rate) of a server in the cluster and a quantity of servers in the cluster. A larger quantity of servers and a stronger hardware capability indicate a larger magnitude of each window. In still some other examples, the magnitude of each window may be alternatively determined based on an empirical value, a setting of a user, or the like. This is not limited in this application.

For example, referring to FIG. 6B, m number of DAGs are queued in the first window, which are a DAG n+1, a DAG n+2, . . . , and a DAG n+m separately; n DAGs are queued in the second window, which are a DAG 1, a DAG 2, . . . , and a DAG n separately; and a DAG n+m+1 and another to-be-executed DAG are queued in the third window.

The DAG matcher is configured to determine a reusable RDD included in a DAG in the first window, and cache the determined reusable RDD in the shared main memory. In some embodiments, when space in the shared main memory is insufficient for storing a to-be-cached RDD, an RDD included in the shared main memory may be selected and stored in the disks, and space originally used for storing the RDD is used for storing the to-be-cached reusable RDD.

The DAG transformer is configured to read a reusable RDD from the shared main memory, transform a DAG in the first window based on the reusable RDD, and place a post-transformation DAG in the second window for waiting for execution.

The RDD sharing system provided in this application may include a process of caching a reusable RDD and a process of transforming a DAG based on a reusable RDD. The following describes the two processes separately.

1. The Process of Caching a Reusable RDD is Described in the Following.

Figure 7:
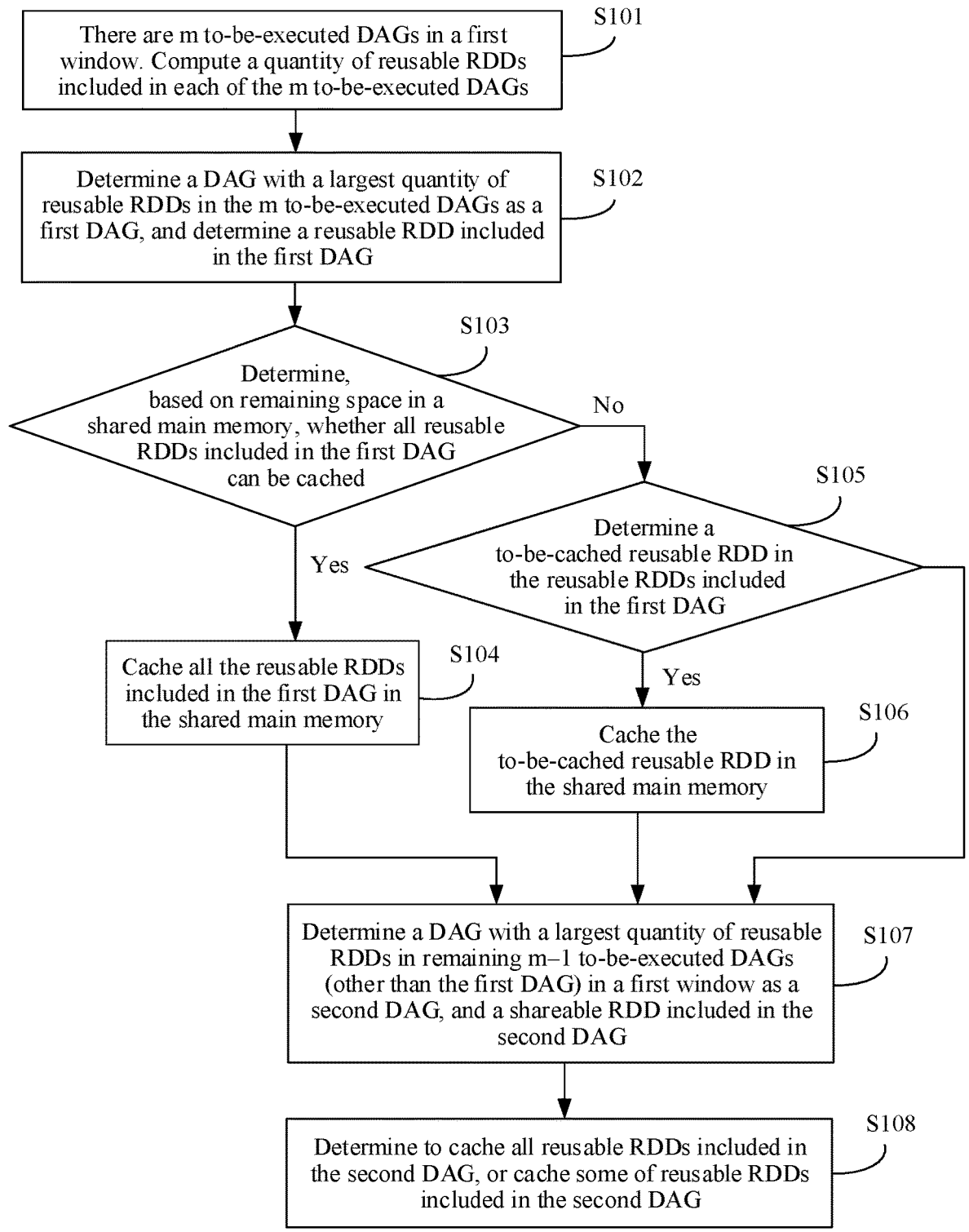
FIG. 7 is a schematic flowchart of another method for caching a shareable RDD in accordance with one or more embodiments.

FIG. 7 is a schematic flowchart of a method for caching a reusable RDD in accordance with one or more embodiments. The caching method includes the following steps.

S101: There are m number of to-be-executed DAGs in a first window. A DAG matcher computes a quantity of reusable RDDs included in each of the m number of to-be-executed DAGs.

A magnitude of the first window may be understood as a quantity of DAGs, an amount of data, or the like in the first window. For example, a quantity of DAGs that can be queued in the first window may be $10^3$ to $10^5$. In some examples, the magnitude of the first window may be determined based on service types (for example, a video service, a music service, or a payment service) of a plurality of application programs running in a cluster. The magnitude of the first window may be the same or different for different service types. In some other examples, the magnitude of the first window may be alternatively determined based on a hardware capability (for example, a main memory or CPU running rate) of a server in the cluster and a quantity of servers in the cluster. A larger quantity of servers and a stronger hardware capability indicate a larger magnitude of the first window. In still some other examples, the magnitude of the first window may be alternatively determined based on an empirical value, a setting of a user, or the like. This is not limited in this embodiment of this application.

S102: The DAG matcher determines a DAG with a largest quantity of reusable RDDs in the m number of to-be-executed DAGs as a first DAG, and determines a reusable RDD included in the first DAG.

In steps S101 and S102, that a DAG can reuse an RDD means that the DAG has the same RDD as another DAG in the first window, the same RDD means that a same task is executed, and therefore the RDD can be reused. That is, after the reusable RDD is cached, the another DAG that includes the reusable RDD may directly invoke the reusable RDD during a computation, thereby reducing a quantity of computations and accelerating a computing speed.

For determining whether two RDDs are the same, when the two RDDs meet the following conditions, it is considered that the two RDDs are the same, and the two RDDs may be determined as reusable RDDs. The conditions are described as follows.

Condition 1: Partitions (Partition) are Consistent.

Each RDD may be divided into a plurality of partitions. Each partition is a dataset segment and is a minimum unit for parallel RDD execution. In addition, different partitions of an RDD may be stored on different worker nodes in the cluster, so that parallel computations may be performed on the different worker nodes in the cluster. Therefore, when it is determined whether two or more RDDs are the same, it needs to be determined whether the two or more RDDs include a same quantity of partitions. Then, it is further determined, according to a condition 2, a condition 3, and a condition 4, whether content in each partition of one RDD is the same as content in a corresponding partition of another RDD.

Condition 2: A Previous RDD that is Depended on is the Same.

As mentioned above, an RDD is obtained after a transformation operation is performed on an existing RDD. When it is determined whether two RDDs are the same, it needs to be determined whether the two RDDs depend on a same previous RDD (that is, a parent RDD). There may be one or more previous RDDs.

Condition 3: A Previous Transformation Operation is the Same.

As mentioned above, an RDD is obtained after a transformation operation is performed on an existing RDD. When it is determined whether two RDDs are the same, it needs to be determined whether previous transformation operations performed on the two RDDs are the same.

Condition 4: Source Data that is Read is the Same.

When an RDD is created, a dataset (that is, source data) in a main memory is read first, then a first RDD is created, and new RDDs are formed after a plurality of transformation operations are performed on the first RDD or its subsequent RDDs. Therefore, when it is determined whether two or more RDDs are the same, it also needs to be determined whether source data that is read is the same.

Figure 8:
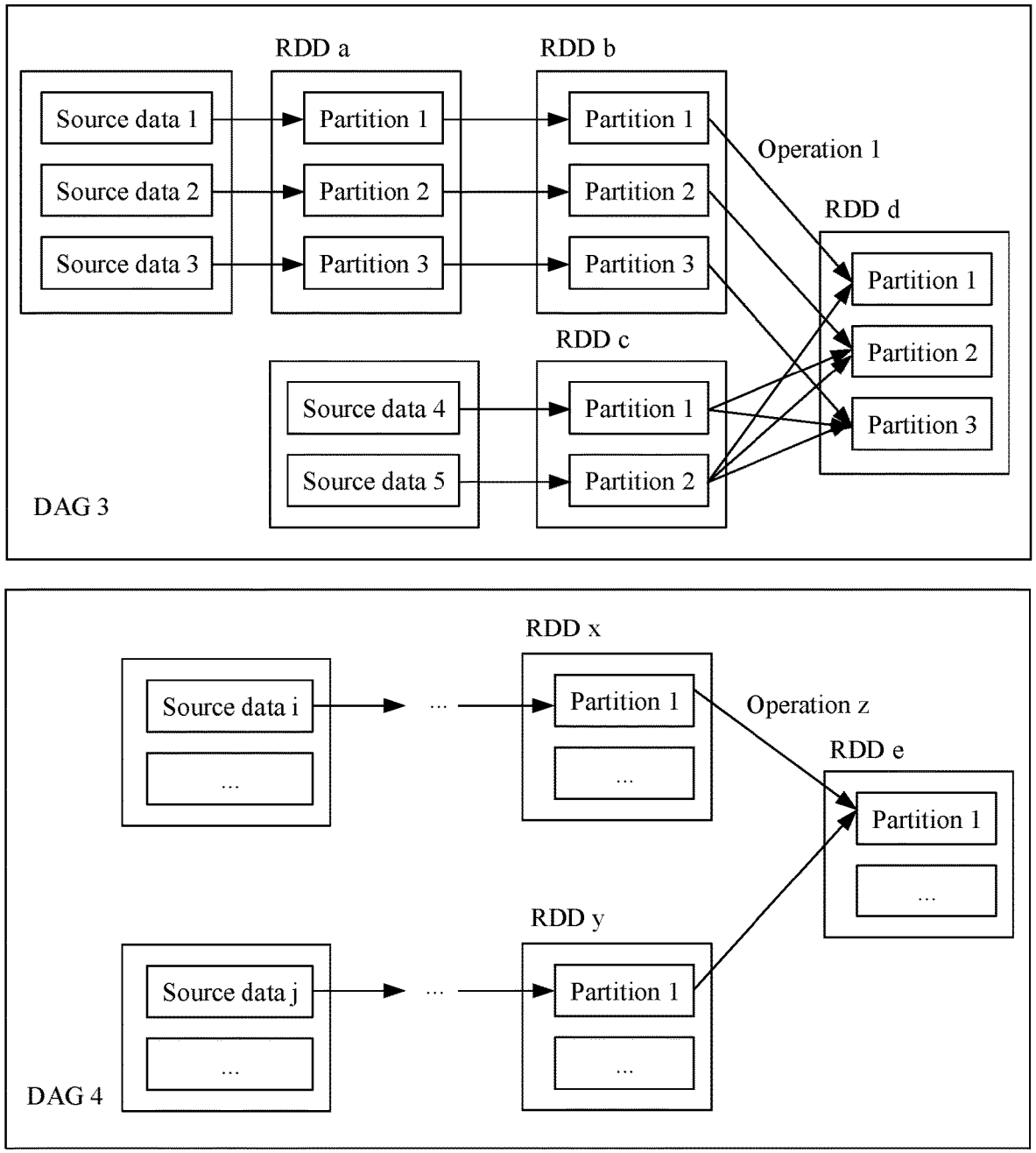
FIG. 8 is a schematic diagram of a method for determining whether two RDDs are the same in accordance with one or more embodiments.

For example, FIG. 8 is a schematic diagram of dependencies in a DAG 3. An RDD d includes three partitions. A partition 1 of the RDD d is obtained after an operation 1 (for example, join) is performed on a partition 1 of an RDD b and a partition 2 of an RDD c. A partition 2 of the RDD d is obtained after the operation 1 (for example, join) is performed on a partition 2 of the RDD b, a partition 1 of the RDD c, and the partition 2 of the RDD c. A partition 3 of the RDD d is obtained after the operation 1 (for example, join)

is performed on a partition 3 of the RDD b, the partition 1 of the RDD c, and the partition 2 of the RDD c.

When it is determined whether an RDD (for example, an RDD e) is the same as the RDD d, a quantity of partitions of the RDD e is first determined, and then it is determined whether the quantity of partitions of the RDD e is the same as a quantity of partitions of the RDD d. If the quantity of partitions of the RDD e is the same as the quantity of partitions of the RDD d, it is considered that the partitions of the RDD e are consistent with the partitions of the RDD d. It is determined that previous parent RDDs that the RDD e depends on are an RDD x and an RDD y. Then it is further determined whether the RDD x and the RDD y are the same as the RDD b and the RDD c respectively. If the RDD x and the RDD y are the same as the RDD b and the RDD c respectively, it is considered that the RDD e and the RDD d depend on the same previous RDDs. It is determined that a previous transformation operation performed on the RDD e is an operation z. Then it is further determined whether the operation z is the same as the operation 1. If the operation z is the same as the operation 1, it is determined that the same previous transformation operation is performed on the RDD e and the RDD d. It is determined that source data used by the RDD e is source data i, source data j, and the like. Then it is determined whether the source data (the source data i, the source data j, and the like) used by the RDD e is the same as source data 1, source data 2, source data 3, source data 4, and source data 5. If the source data (the source data i, the source data j, and the like) used by the RDD e is the same as the source data 1, the source data 2, the source data 3, the source data 4, and the source data 5 respectively, it is determined that the RDD e and the RDD d have the same source data. When all of the four conditions are met, it can be determined that the RDD e is the same as the RDD d.

A quantity of reusable RDDs included in a DAG is a total quantity of reusable RDDs determined after the DAG is compared with the other DAGs in the first window one by one.

For example, there are m number of DAGs in the first window, which are a DAG n+1, a DAG n+2, . . . , and a DAG n+m separately. Computation of a quantity of reusable RDDs included in the DAG n+1 is described. For example, the DAG n+1 may be separately compared with the other m−1 DAGs in the first window, to determine whether there is a reusable RDD. It is assumed that the DAG n+1 and the DAG n+2 have two reusable RDDs, which are an RDD 3 and an RDD 7 separately; the DAG n+1 and a DAG n+3 have two reusable RDDs, which are the RDD 3 and an RDD 5 separately; a DAG n+1 and the DAG n+4 have one reusable RDD, which is an RDD 2; a DAG n+5 and the DAG n+1 have one reusable RDD, which is an RDD 6; and the other DAGs and the DAG n+1 have no reusable RDD. In this case, there are five reusable RDDs in the DAG n+1, which are the RDD 3, the RDD 7, the RDD 5, the RDD 2, and the RDD 6 separately.

By analogy, a quantity of reusable RDDs included in another DAG in the first window is computed. It is assumed that there are three reusable RDDs in the DAG n+2, there are two reusable RDDs in the DAG n+3, and there is one reusable RDD in each of the other DAGs. In this case, it may be determined that the DAG n+1 has a largest quantity of reusable RDDs. The reusable RDDs (the RDD 3, the RDD 7, the RDD 5, the RDD 2, and the RDD 6) included in the DAG n+1 may be cached.

In some embodiments, a DAG with a largest quantity of reusable RDDs may be selected first, and the reusable RDDs included in the DAG may be cached. Because the DAG has the largest quantity of RDDs that can be reused by another DAG, the reusable RDDs included in the DAG are preferably cached. This can greatly reduce a quantity of repeated computations and reduce an amount of repeatedly cached data, which helps accelerate a computing speed of Spark and save cache costs.

S103: The DAG matcher determines, based on remaining space in a shared main memory, whether all reusable RDDs included in the first DAG can be cached. If all the reusable RDDs included in the first DAG can be cached, step S104 is performed. Otherwise, step S105 is performed.

In some examples, the DAG matcher reads the remaining space in the shared main memory, and compares the remaining space with total space that needs to be occupied for caching all the reusable RDDs included in the first DAG. If the remaining space in the shared main memory is greater than or equal to the total space that needs to be occupied by all the reusable RDDs included in the first DAG, it is determined that all the reusable RDDs included in the first DAG can be cached, which is referred to as "all can be cached" for short. Otherwise, it is determined that not all the reusable RDDs included in the first DAG can be cached.

For example, the DAG n+1 is still used as an example for description. There are five reusable RDDs in the DAG n+1, which are the RDD 3, the RDD 7, the RDD 5, the RDD 2, and the RDD 6 separately. Total space that needs to be occupied for caching all the reusable RDDs included in the DAG n+1 indicates space in the shared main memory that needs to be occupied when all of the RDD 3, the RDD 7, the RDD 5, the RDD 2, and the RDD 6 are cached in the shared main memory.

In some examples, the DAG matcher may alternatively first determine whether all the reusable RDDs included in the first DAG can be found. If all the reusable RDDs included in the first DAG can be found, the DAG matcher may further determine whether all the reusable RDDs can be cached in the remaining space in the shared main memory. If a reusable RDD is not found, it may be directly determined that not all the reusable RDDs can be cached. It is further determined whether some reusable RDDs that are found and that are depended on in the first DAG can be cached. That is, step S105 is performed.

S104: The DAG matcher caches all the reusable RDDs included in the first DAG in the shared main memory.

Then, step S107 is performed.

S105: The DAG matcher determines a to-be-cached reusable RDD in the reusable RDDs included in the first DAG.

In some examples, the DAG matcher may select, based on the remaining space in the shared main memory, some reusable RDDs from the reusable RDDs included in the first DAG as to-be-cached reusable RDDs, and cache the to-be-cached reusable RDDs. That is, some of the reusable RDDs included in the first DAG are cached. That is, at least one reusable RDD included in the first DAG is not cached.

For example, the example in which the first DAG is the DAG n+1 is still used for description. There are five reusable RDDs in the DAG n+1, which are the RDD 3, the RDD 7, the RDD 5, the RDD 2, and the RDD 6 separately. When it is determined in step S103 that the remaining space in the shared main memory is insufficient for caching the RDD 3, the RDD 7, the RDD 5, the RDD 2, and the RDD 6, some RDDs may be selected from the RDD 3, the RDD 7, the RDD 5, the RDD 2, and the RDD 6 for caching. Caching some of the reusable RDDs included in the DAG n+1 means that any one, two, three, or four of the RDD 3, the RDD 7, the RDD 5, the RDD 2, and the RDD 6 may be cached.

In some embodiments, when the DAG matcher selects a to-be-cached reusable RDD from the reusable RDDs included in the first DAG, the DAG matcher may determine the to-be-cached reusable RDD based on factors such as use frequency of a reusable RDD (a quantity of times that an RDD can be reused), a computing duration of a reusable RDD, a magnitude of a parent RDD that a reusable RDD depends on, a magnitude of a reusable RDD, or a weight of a reusable RDD. The DAG matcher may alternatively select and cache some of reusable RDDs that are found. A method for selecting a reusable RDD is not limited in this application.

For example, a pre-determined quantity of reusable RDDs with higher use frequency may be selected from the reusable RDDs included in the first DAG as the to-be-cached reusable RDDs. Alternatively, a pre-determined quantity of reusable RDDs with a longer computing duration may be selected from the reusable RDDs included in the first DAG as the to-be-cached reusable RDDs. Alternatively, a pre-determined quantity of reusable RDDs with a dependent parent RDD of a larger magnitude may be selected from the reusable RDDs included in the first DAG as the to-be-cached reusable RDDs. Alternatively, a pre-determined quantity of reusable RDDs with a larger reusable RDD magnitude may be selected from the reusable RDDs included in the first DAG as the to-be-cached reusable RDDs. Alternatively, a pre-determined quantity of reusable RDDs with a larger weight may be selected from the reusable RDDs included in the first DAG as the to-be cached reusable RDDs.

For example, the example in which the first DAG is the DAG n+1 is still used for description. There are five reusable RDDs in the DAG n+1, which are the RDD 3, the RDD 7, the RDD 5, the RDD 2, and the RDD 6 separately. When it is determined in step S103 that the remaining space in the shared main memory is insufficient for caching the RDD 3, the RDD 7, the RDD 5, the RDD 2, and the RDD 6, some RDDs may be selected from the RDD 3, the RDD 7, the RDD 5, the RDD 2, and the RDD 6 for caching. It is assumed that, in the first window, the RDD 3 can be reused six times, the RDD 7 can be reused five times, the RDD 5 can be reused four times, the RDD 2 can be reused three times, and the RDD 6 can be reused two times. An RDD with a largest quantity of reuse times may be selected for caching, for example, the RDD 3. Alternatively, a preset quantity of RDDs with a large quantity of reuse times may be selected for caching, for example, the RDD 3 and the RDD 7. Details are not described herein.

A weight of an RDD may be determined based on a service type of an application program, may be determined based on a setting of a user, or may be determined according to a predefined method. The following provides an example of a method for computing a weight of an RDD, that is, determining a weight of an RDD according to Equation 1 as $$W(RDDi) = \frac{Parent(RDDi) \times c \times F}{RDDsize} \quad \text{(Eq. 1)}$$

In Equation 1, $W(RDDi)$ is a weight of the $i^{th}$ RDD; $Parent(RDDi)$ is a sum of magnitudes of all parent RDDs of the $i^{th}$ RDD; $c$ is cost of computing the $i^{th}$ RDD, and may reflect complexity of computing the $i^{th}$ RDD, for example, reflecting time spent in computing the $i^{th}$ RDD; $F$ is a quantity of times that the $i^{th}$ RDD is used, that is, a quantity of times that the $i^{th}$ RDD can be reused; and $RDDmagnitude$ is a magnitude of the $i^{th}$ RDD.

Cost of computing an RDD may be complexity of computing a transformation operation for the RDD. Different transformation operations have different computing complexity. For example, common transformation operations mentioned above include map, filter, flatMap, reduceByKey, join, union, and the like. A simple comparison of computing complexity is provided herein. Computing complexity of map is similar to that of filter. Computing complexity of flatMap is similar to that of reduceByKey. The computing complexity of map and the computing complexity of filter are lower than the computing complexity of flatMap and the computing complexity of reduceByKey. Computing complexity of join and computing complexity of union are related to a quantity of included partitions. A larger quantity of partitions indicates higher computing complexity. A specific algorithm for cost of computing an RDD is not limited in this application.

It should be further noted that, in Equation 1, a parameter on the right side of the equation may include any one or more of Parent(RDDi), c, F, and RDDmagnitude, or more parameters are included. The method for computing a weight of an RDD is not limited in this application.

For example, the equation for computing a weight of an RDD may alternatively be any one of Equation 2 to Equation 7 in the following:

$$W(RDDi) = \frac{Parent(RDDi) \times c}{RDDsize} \quad \text{(Eq. 2)}$$

$$W(RDDi) = \frac{Parent(RDDi) \times F}{RDDsize} \quad \text{(Eq. 3)}$$

$$W(RDDi) = \frac{c \times F}{RDDsize} \quad \text{(Eq. 4)}$$

$$W(RDDi) = Parent(RDDi) \times c \times F \quad \text{(Eq. 5)}$$

$$W(RDDi) = Parent(RDDi) \times c \quad \text{(Eq. 6)}$$

$$W(RDDi) = \frac{Parent(RDDi)}{RDDsize} \quad \text{(Eq. 7)}$$

In some other embodiments, the DAG matcher may preset a quantity of to-be-cached reusable RDDs, that is, statically specify the quantity of to-be-cached reusable RDDs as a preset quantity, for example, one or more. Alternatively, the DAG matcher may dynamically determine the quantity of to-be-cached reusable RDDs based on the remaining space in the shared main memory. For example, a to-be-cached reusable RDD is first selected from the first DAG, and then it is determined, based on the remaining space in the shared main memory and a magnitude of the selected to-be-cached reusable RDD, whether the to-be-cached reusable RDD can be cached. Then, a next to-be-cached reusable RDD is selected from the first DAG, and so on until no more reusable RDD included in the first DAG can be cached in remaining space in the shared main memory after a selected to-be-cached reusable RDD is cached.

S106: The DAG matcher caches the to-be-cached reusable RDD in the shared main memory.

S107: The DAG matcher determines a DAG with a largest quantity of reusable RDDs in the remaining m−1 to-be-executed DAGs (other than the first DAG) in the first window as a second DAG, and a reusable RDD included in the second DAG.

For exemplary implementation of this step, refer to step S102. Details are not described herein again.

S108: The DAG matcher determines to cache all reusable RDDs included in the second DAG, or cache some of reusable RDDs included in the second DAG.

For exemplary implementation of this step, refer to step S103 to step S106. Details are not described herein again.

By analogy, it is sequentially determined, based on an order of quantities of reusable RDDs, whether all or some of reusable RDDs included in each of the m number of DAGs in the first window can be cached. After it is determined whether all or some of the reusable RDDs included in the m number of DAGs in the first window can be cached, this process ends. In some examples, when the DAG matcher executes this process, if it is determined that remaining space in the shared main memory reaches a specific threshold, it may be considered that the remaining space in the shared main memory is insufficient for caching a subsequent reusable RDD, and the process may be stopped.

When there is a vacancy in the second window, a DAG queued in the front in the first window enters the second window after being transformed by a DAG transformer. In this case, there is also a vacancy in the first window. Then, a DAG queued in the front in a third window enters the first window. In other words, the m number of DAGs in the first window enter the second window one by one, and at the same time, new DAGs are added to the first window one by one from the third window.

In this case, the DAG matcher performs operations the same as those in steps S101 to S108 on m number of DAGs, queued in the first window, of a next batch. Details are not described herein again.

In some embodiments of this application, when some DAGs in the m number of DAGs of the next batch are queued in the first window, the DAG matcher may start to perform the operations the same as those in steps S101 to S108 on the m number of DAGs of the next batch. The DAG matcher may alternatively start to perform the corresponding operations only when the m number of DAGs of the next batch are all queued in the first window. This is not limited in this application.

By analogy, the DAG matcher performs the operations the same as those in steps S101 to S108 on every m number of DAGs in the first window. Details are not described herein again.

Figure 9A:
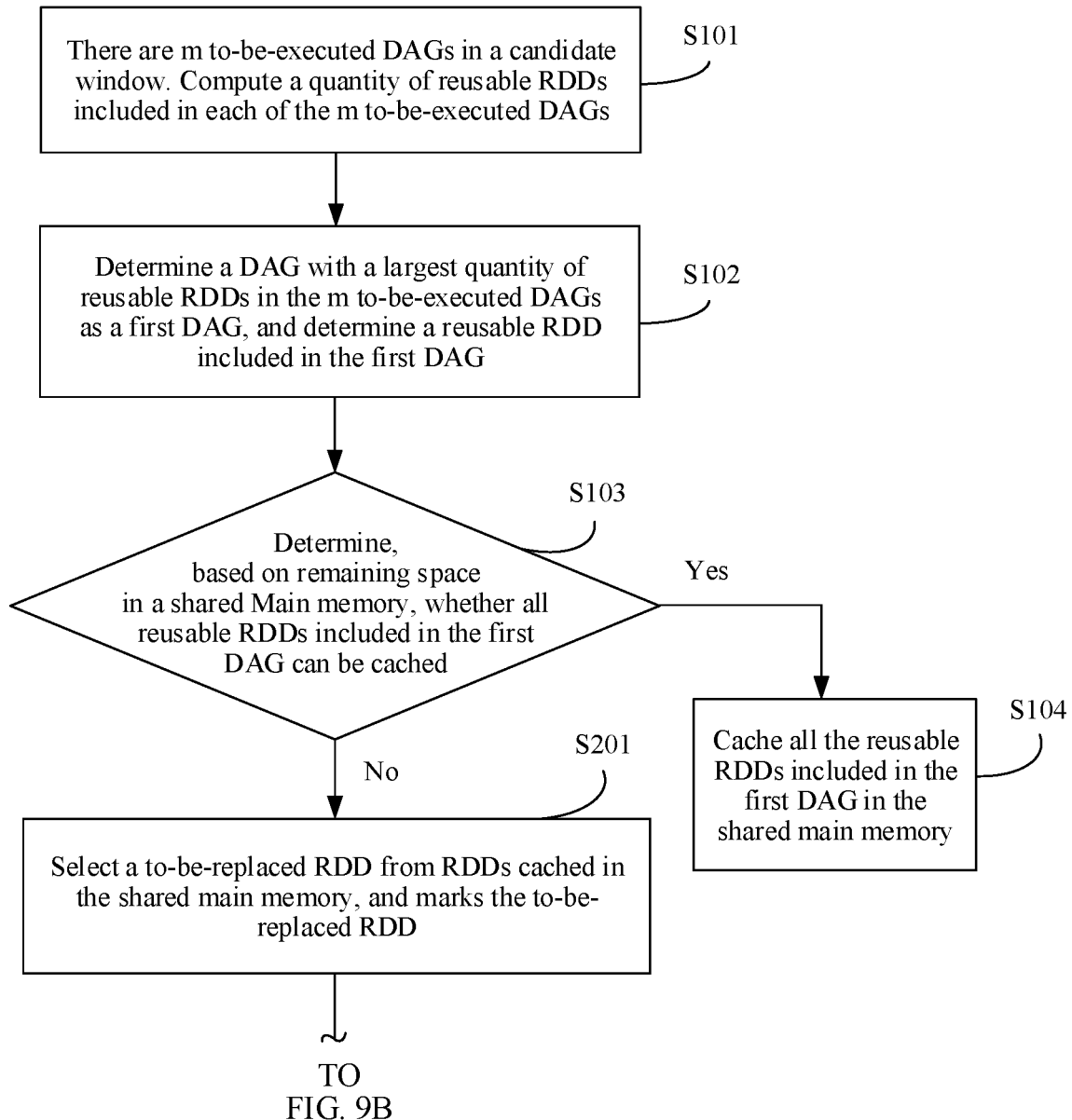
FIG. 9A and FIG. 9B are a schematic flowchart of still another method for caching a sharable RDD in accordance with one or more embodiments.
Figure 9B:
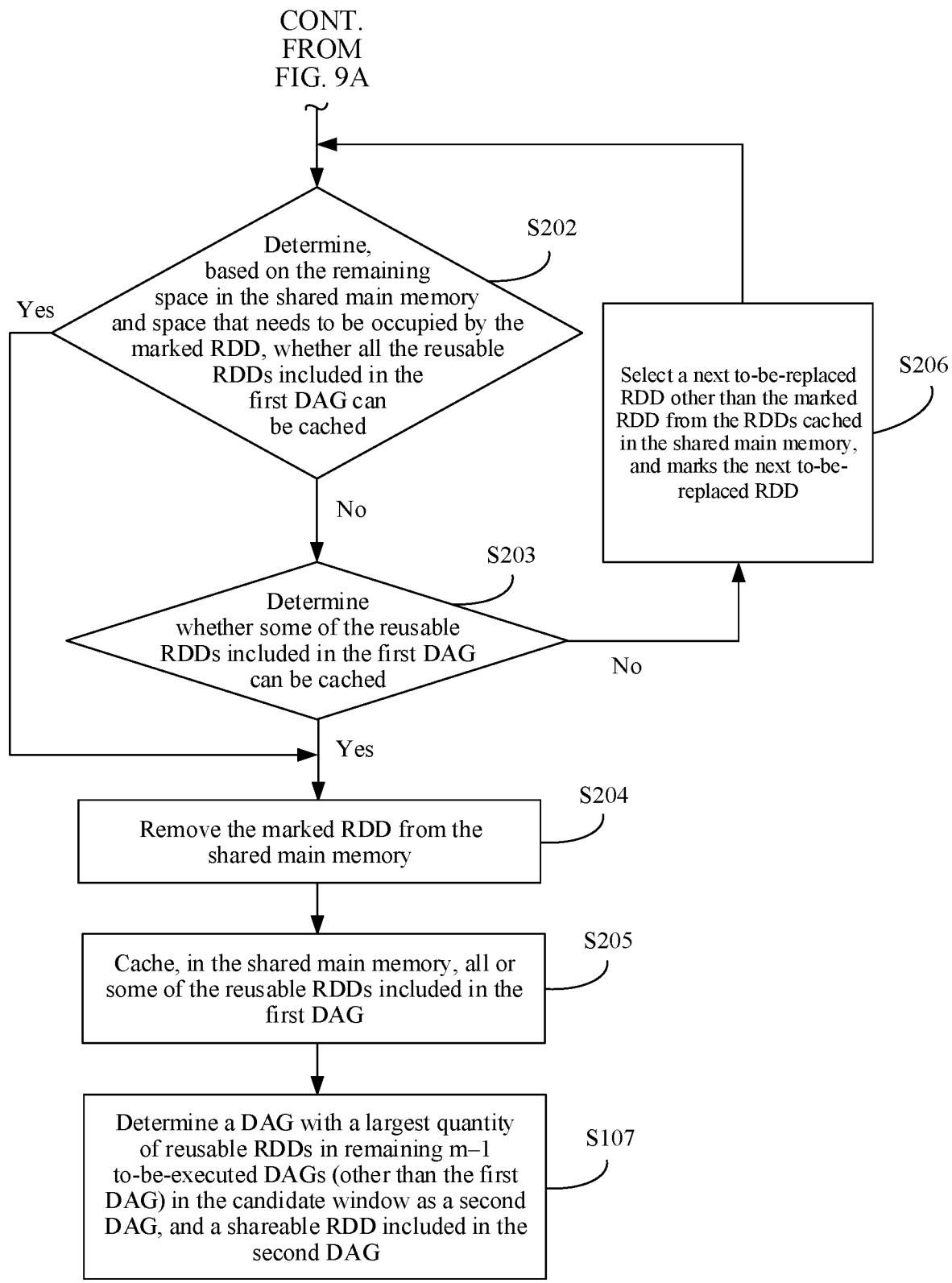

In some other embodiments, when remaining space in the shared main memory is insufficient for all reusable RDDs included in a DAG, these to-be-cached reusable RDDs may be used to replace some less important RDDs that are originally cached in the shared main memory and that are used as to-be-replaced RDDs, for example, an RDD with a small weight. In other words, steps S105 to S106 in the foregoing embodiment may be replaced with steps S201 to S206. FIG. 9A and FIG. 9B are a flowchart of still another method for caching a reusable RDD according to an embodiment of this application. The method includes steps S101 to S104, steps S201 to S206, and step S107. For steps S101 to S104 and step S107, refer to the foregoing description. Steps S201 to S206 are described as follows.

S201: The DAG matcher selects a to-be-replaced RDD from RDDs cached in the shared main memory, and marks the to-be-replaced RDD.

In some examples, the DAG matcher may select some less important RDDs as the to-be-replaced RDDs, where the to-be-replaced RDD may be an RDD with lower use frequency, an RDD with a shorter computing duration, an RDD with a dependent parent RDD of a smaller magnitude, an RDD with a larger magnitude, an RDD with a smaller weight, or the like. This is not limited in this application.

S202: The DAG matcher determines, based on the remaining space in the shared main memory and a magnitude of the marked RDD, whether all the reusable RDDs included in the first DAG can be cached. If all the reusable RDDs included in the first DAG can be cached, step S204 is performed. Otherwise, step S203 is performed.

S203: The DAG matcher determines whether some of the reusable RDDs included in the first DAG can be cached. If some of the reusable RDDs included in the first DAG can be cached, step S204 is performed. Otherwise, step S206 is performed.

In some examples, the DAG matcher determines, based on the remaining space in the shared main memory and the magnitude of the marked RDD, whether some of the reusable RDDs included in the first DAG can be cached. For description of selection of some of the reusable RDDs from the first DAG, refer to related description in step S105. Details are not described herein again.

S204: The DAG matcher removes the marked RDD from the shared main memory.

In some examples, the DAG matcher may directly delete the marked RDD from the shared main memory, or may store the marked RDD in external storage, for example, in a disk.

S205: The DAG matcher caches, in the shared main memory, all or some of the reusable RDDs included in the first DAG.

Then, step S107 and subsequent steps are performed.

S206: The DAG matcher selects a next to-be-replaced RDD other than the marked RDD from the RDDs cached in the shared main memory, and marks the next to-be-replaced RDD.

Then, step S202 is performed.

2. The Process of Transforming a DAG Based on a Reusable RDD is Described in the Following.

Figure 10:
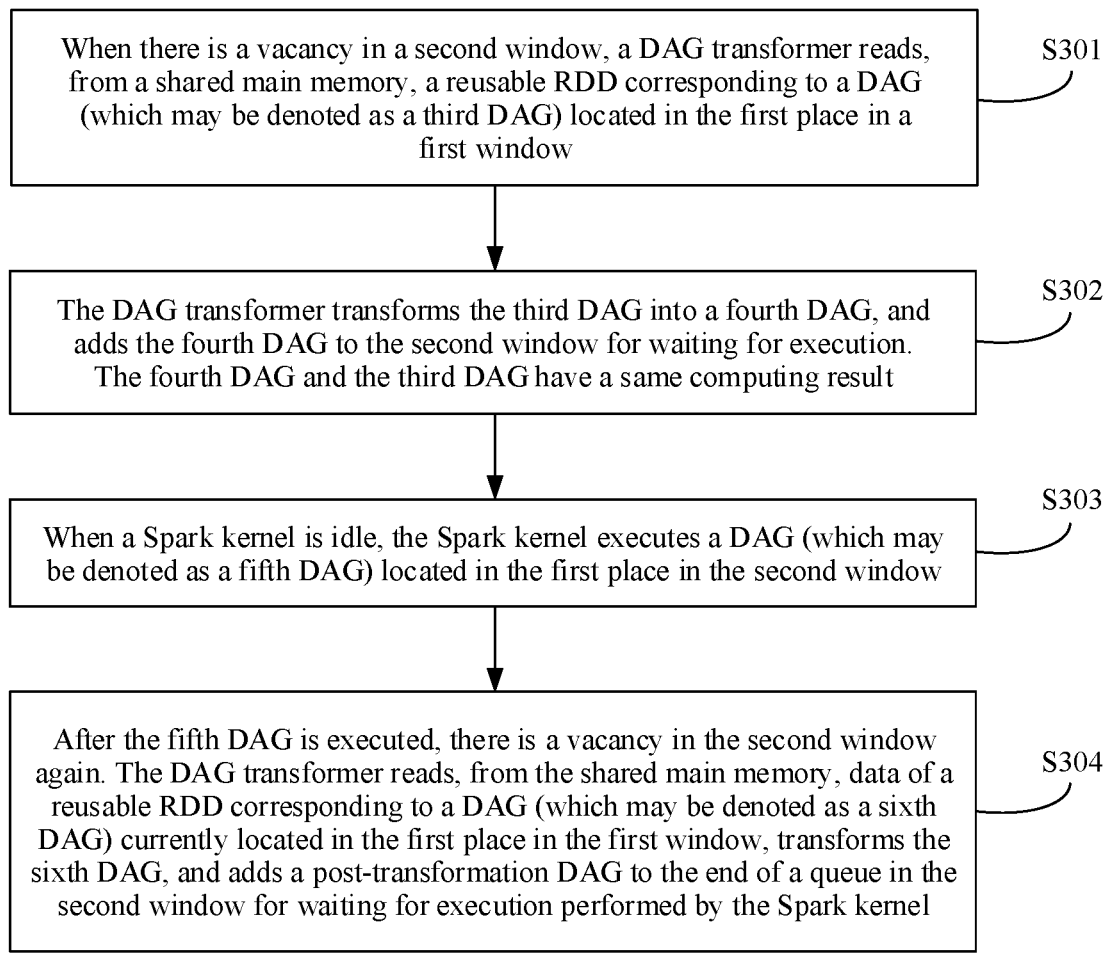
FIG. 10 is a schematic flowchart of a method for using a shareable RDD in accordance with one or more embodiments.

FIG. 10 is a flowchart of a method for using a reusable RDD in accordance with one or more embodiments. The method includes the following steps.

S301: When there is a vacancy in a second window, a DAG transformer reads, from a shared main memory, a reusable RDD corresponding to a DAG (which may be denoted as a third DAG) located in the first place in a first window.

The DAG located in the first place in the first window is a to-be-executed DAG located at the beginning of a queue in the first window, that is, a to-be-executed DAG that is in the first window and that is adjacent to the second window.

S302: The DAG transformer transforms the third DAG into a fourth DAG, and adds the fourth DAG to the second window for waiting for execution. The fourth DAG and the third DAG have a same computing result.

In some examples, the third DAG is transformed based on the reusable RDD (that is, the reusable RDD read in step S301) that is cached in the shared main memory, and an RDD part that is included in the third DAG and that is the same as the reusable RDD is replaced with an RDD part that depends on the reusable RDD, thereby obtaining the fourth DAG.

For example, an example in which the third DAG is the DAG 1 shown in FIG. 2 is used for description. The third DAG includes that a map operation is performed on a text file (source data) to generate an RDD 1, and then a filter operation is performed to generate an RDD 2, where the RDD 1 is a reusable RDD that is cached in the shared main memory. When reading the RDD 1, the DAG transformer transforms the DAG 1. The fourth DAG includes that the filter operation is performed on the RDD 1 to generate the RDD 2, where the RDD 1 is the reusable RDD. The operation is available in the prior art, and details are not described herein.

It can be learned that the third DAG includes two transformation operations: the map operation and the filter operation, whereas the fourth DAG includes only the filter operation. It should be obvious that time spent in computing the fourth DAG is less than time spent in computing the third DAG.

S303: When a Spark kernel is idle, the Spark kernel executes a DAG (which may be denoted as a fifth DAG) located in the first place in the second window.

The DAG located in the first place in the second window is a DAG located at the beginning of a queue in the second window, that is, a DAG for which transformation based on a reusable RDD is currently completed first in the second window, and that waits for execution performed by the Spark kernel. For example, when the Spark kernel is idle, a SparkContext decomposes an RDD included in a to-be-executed DAG in the second window into stages, further decomposes the stages into tasks, and allocates the tasks to corresponding worker nodes for execution.

S304: After the fifth DAG is executed, there is a vacancy in the second window again. The DAG transformer reads, from the shared main memory, data of a reusable RDD corresponding to a DAG (which may be denoted as a sixth DAG) currently located in the first place in the first window, transforms the sixth DAG, and adds a post-transformation DAG to the end of the queue in the second window for waiting for execution performed by the Spark kernel.

For an exemplary operation, refer to step S301 to step S303. Details are not described herein again.

By analogy, when the Spark kernel is idle, DAGs in the second window are executed sequentially. Whenever there is a vacancy in the second window, a DAG located in the first place in the first window is read sequentially. After the DAG is transformed, a post-transformation DAG is added to the end of the queue in the second window to wait for execution.

In some examples, after executing a batch of DAGs, the Spark kernel may delete reusable RDDs corresponding to the batch of DAGs, to release space in the shared main memory, cache a reusable RDD included in another DAG in the first window, and improve utilization of the shared main memory. For example, by using m number of DAGs in the first window as a unit, after the Spark kernel completes executing DAGs obtained by transforming the m number of DAGs, the Spark kernel may delete reusable RDDs corresponding to the m number of DAGs. Optionally, after the Spark kernel completes executing DAGs generated by transforming n×m DAGs (n is an integer greater than 2), the Spark kernel may alternatively delete reusable RDDs corresponding to the n×m DAGs.

It may be understood that, to implement the functions described in the foregoing method embodiments, the device such as a terminal includes a corresponding hardware structure and/or a software module for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular application programs and design constraints of the technical solutions. A person skilled in the art may use different methods to implement the described functions for each particular application program, but it should not be considered that the implementation goes beyond the scope of the embodiments of the present application.

In the embodiments of this application, functional module division may be performed on the terminal and the like based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in the present application, module division is an example, and is merely a logical function division. In actual implementation, another division manner may be used.

The foregoing descriptions about implementations allow a person skilled in the art to clearly understand that, for the purpose of convenient and brief description, division of the foregoing function modules is taken as an example for illustration. In actual application program, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, technical solutions of this application may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash main memory, a removable hard disk, a read-only main memory, a random access main memory, a magnetic disk, or an optical disc.

The foregoing descriptions are merely exemplary implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for processing shared data, wherein the method is applied to a server cluster, and the method comprises:

receiving, by a first server, a first instruction for starting a first application program;

in response to the first instruction, starting, by the first server, a first Spark context for the first application program, to create a directed acyclic graph (DAG) of the first application program, and caching the DAG of the first application program in a first area of the first server;

receiving, by the first server, a second instruction for starting a second application program;

in response to the second instruction, starting, by the first server, a second Spark context for the second application program, to create a DAG of the second application program, and caching the DAG of the second application program in the first area of the first server;

reading, by the first server, two or more DAGs from the first area, wherein the two or more DAGs comprise the DAG of the first application program and the DAG of the second application program;

determining, by the first server, to-be-cached shareable resilient distributed datasets (RDDs) based on the two or more DAGs, including determining a quantity of shareable RDDs comprised in each of the two or more DAGs, determining a shareable RDD comprised in a first DAG and determining, based on remaining space in a main memory of a second server, a to-be-cached shareable RDD comprised in the first DAG; and caching the to-be-cached shareable RDDs comprised in the first DAG in the main memory of the second server, wherein a shareable RDD is an RDD comprised in at least two DAGs of the two or more DAGs, and wherein the first DAG is a DAG with a largest quantity of shareable RDDs in the two or more DAGs.

2. The method according to claim 1, wherein determining, based on the remaining space in the main memory of the second server, the to-be-cached shareable RDD comprised in the first DAG further comprises:

in response to the remaining space in the main memory of the second server being greater than or equal to a sum of magnitudes of all shareable RDDs comprised in the first DAG, determining all the shareable RDDs comprised in the first DAG as the to-be-cached shareable RDDs; and in response to the remaining space in the main memory of the second server being less than the sum of magnitudes of all shareable RDDs comprised in the first DAG, determining some of the shareable RDDs comprised in the first DAG as the to-be-cached shareable RDDs.

3. The method according to claim 2, wherein determining some of the shareable RDDs comprised in the first DAG as the to-be-cached shareable RDDs further comprises:

determining, based on a magnitude, a quantity of reuse times, a computing duration, or a magnitude of a dependent parent RDD of each shareable RDD comprised in the first DAG, some of the shareable RDDs comprised in the first DAG as the to-be-cached shareable RDDs; or determining a shareable RDD that is found in the first DAG as the to-be-cached shareable RDD.

4. The method according to claim 1, wherein determining, based on the remaining space in the main memory of the second server, the to-be-cached shareable RDD comprised in the first DAG further comprises:

in response to the remaining space in the main memory of the second server being greater than or equal to a sum of magnitudes of all shareable RDDs comprised in the first DAG, determining all the shareable RDDs comprised in the first DAG as the to-be-cached shareable RDDs; and in response to the remaining space in the main memory of the second server being less than the sum of magnitudes of all shareable RDDs comprised in the first DAG, determining a to-be-replaced RDD comprised in the main memory of the second server, and determining, based on the remaining space in the main memory of the second server and a magnitude of the to-be-replaced RDD, the to-be-cached shareable RDD comprised in the first DAG.

5. The method according to claim 4, wherein determining the to-be-replaced RDD comprised in the main memory of the second server further comprises:

determining the to-be-replaced RDD based on a magnitude, a quantity of reuse times, a computing duration, or a magnitude of a dependent parent RDD of each shareable RDD cached in the main memory of the second server.

6. The method according to claim 4, wherein determining, based on the remaining space in the main memory of the second server and the magnitude of the to-be-replaced RDD, the to-be-cached shareable RDD comprised in the first DAG further comprises:

in response to a sum of the remaining space in the main memory of the second server and the magnitude of the to-be-replaced RDD being greater than or equal to the sum of the magnitudes of all the shareable RDDs comprised in the first DAG, determining all the shareable RDDs comprised in the first DAG as the to-be-cached shareable RDDs; and in response to the sum of the remaining space in the main memory of the second server and the magnitude of the to-be-replaced RDD being less than the sum of the magnitudes of all the shareable RDDs comprised in the first DAG, determining some of the shareable RDDs comprised in the first DAG as the to-be-cached shareable RDDs.

7. The method according to claim 6, wherein determining some of the shareable RDDs comprised in the first DAG as the to-be-cached shareable RDDs further comprises:

determining, based on a magnitude, a quantity of reuse times, a computing duration, or a magnitude of a dependent parent RDD of each shareable RDD comprised in the first DAG, some of the shareable RDDs comprised in the first DAG as the to-be-cached shareable RDDs; or determining a shareable RDD that is found in the first DAG as the to-be-cached shareable RDD.

8. The method according to claim 4, wherein caching the to-be-cached shareable RDD comprised in the first DAG further comprises:

removing the to-be-replaced RDD from the main memory of the second server, and caching the to-be-cached shareable RDD comprised in the first DAG.

9. The method according to claim 1 further comprising:

determining a third DAG in the two or more DAGs; and reading a shareable RDD comprised in the third DAG from the main memory of the second server, and transforming the third DAG into a fourth DAG based on the shareable RDD comprised in the third DAG, wherein an execution result of the fourth DAG and an execution result of the third DAG are the same, and an execution duration of the fourth DAG is less than an execution duration of the third DAG.

10. The method according to claim 9, wherein the main memory of the second server is a main memory of the first server, the main memory of the second server, or a sum of at least some of the main memory of the first server and at least some of the main memory of the second server.

11. A server comprising a processor, a non-transitory computer-readable medium having computer-executable instructions stored thereon, and a communications interface, wherein the non-transitory computer-readable medium and the communications interface are coupled to the processor, wherein the computer-executable instructions, when executed by the processor, cause the processor to facilitate:

receiving a first instruction for starting a first application program, starting a first Spark context for the first application program to create a directed acyclic graph (DAG) of the first application program, and caching the DAG of the first application program in a first area of a first server;

receiving a second instruction for starting a second application program, starting a second Spark context for the second application program to create a DAG of the second application program, and caching the DAG of the second application program in the first area of the first server;

reading two or more DAGs from the first area, wherein the two or more DAGs comprise the DAG of the first application program and the DAG of the second application program;

determining to-be-cached shareable resilient distributed datasets (RDDs) based on the two or more DAGs, including determining a quantity of shareable RDDs comprised in each of the two or more DAGs, determining a shareable RDD comprised in a first DAG and determining, based on remaining space in a main memory of a second server, a to-be-cached shareable RDD comprised in the first DAG; and caching the to-be-cached shareable RDDs comprised in the first DAG in the main memory of the second server, wherein a shareable RDD is an RDD comprised in at least two DAGs of the two or more DAGs, and wherein the first DAG is a DAG with a largest quantity of shareable RDDs in the two or more DAGs.

12. The server according to claim 11, wherein the processor executes the instruction to further facilitate:

in response to the remaining space in the main memory of the second server being greater than or equal to a sum of magnitudes of all shareable RDDs comprised in the first DAG, determining all the shareable RDDs comprised in the first DAG as the to-be-cached shareable RDDs; and in response to the remaining space in the main memory of the second server being less than the sum of magnitudes of all shareable RDDs comprised in the first DAG, determining some of the shareable RDDs comprised in the first DAG as the to-be-cached shareable RDDs.

13. The server according to claim 12, wherein the processor executes the instruction to further facilitate:

determining, based on a magnitude, a quantity of reuse times, a computing duration, or a magnitude of a dependent parent RDD of each shareable RDD comprised in the first DAG, some of the shareable RDDs comprised in the first DAG as the to-be-cached shareable RDDs; or determining a shareable RDD that is obtained through a queryfound in the first DAG as the to-be- cached shareable RDD.

14. The server according to claim 11, wherein the processor executes the instruction to further facilitate:

in response to the remaining space in the main memory of the second server being greater than or equal to a sum of magnitudes of all shareable RDDs comprised in the first DAG, determining all the shareable RDDs comprised in the first DAG as the to-be-cached shareable RDDs; and in response to the remaining space in the main memory of the second server being less than the sum of magnitudes of all shareable RDDs comprised in the first DAG, determining a to-be-replaced RDD comprised in the main memory of the second server, and determining, based on the remaining space in the main memory of the second server and a magnitude of the to-be-replaced RDD, the to-be-cached shareable RDD comprised in the first DAG.

15. The server according to claim 14, wherein the processor executes the instruction to further facilitate:

determining the to-be-replaced RDD based on a magnitude, a quantity of reuse times, a computing duration, or a magnitude of a dependent parent RDD of each shareable RDD cached in the main memory of the second server.

16. The server according to claim 14, wherein the processor executes the instruction to further facilitate:

in response to a sum of the remaining space in the main memory of the second server and the magnitude of the to-be-replaced RDD beings greater than or equal to the sum of the magnitudes of all the shareable RDDs comprised in the first DAG, determining all the shareable RDDs comprised in the first DAG as the to-be-cached shareable RDDs; and in response to the sum of the remaining space in the main memory of the second server and the magnitude of the to-be-replaced RDD being less than the sum of the magnitudes of all the shareable RDDs comprised in the first DAG, determining some of the shareable RDDs comprised in the first DAG as the to-be-cached shareable RDDs.

17. The server according to claim 11, wherein the processor executes the instruction to further facilitate:

determining a third DAG in the two or more DAGs; and reading a shareable RDD comprised in the third DAG from the main memory of the second server, and transforming the third DAG into a fourth DAG based on the shareable RDD comprised in the third DAG, wherein an execution result of the fourth DAG and an execution result of the third DAG are the same.

18. The server according to claim 17, wherein the main memory of the second server is a main memory of the first server, the main memory of the second server, or a sum of at least some of the main memory of the first server and at least some of the main memory of the second server.

* * * * *

UNITED STATES PATENT AND TRADEMARK OFFICE
CERTIFICATE OF CORRECTION

| | |
|---|---|
| PATENT NO. | : 11,445,004 B2 |
| APPLICATION NO. | : 17/415573 |
| DATED | : September 13, 2022 |
| INVENTOR(S) | : Tan et al. |

It is certified that error appears in the above-identified patent and that said Letters Patent is hereby corrected as shown below:

On the Title Page

Item (71): "Petal Cloud Technology Co., Ltd., Shenzhen (CN)" should read -- Petal Cloud Technology Co., Ltd., Dongguan (CN) --.

Signed and Sealed this
Thirty-first Day of January, 2023

Katherine Kelly Vidal
*Director of the United States Patent and Trademark Office*